United States Patent
Bangolae et al.

(10) Patent No.: US 10,904,933 B2
(45) Date of Patent: Jan. 26, 2021

(54) UE-TO-NETWORK RELAY INITIATION AND CONFIGURATION

(71) Applicant: Apple Inc., Cupertino, CA (US)

(72) Inventors: Sangeetha Bangolae, Houston, TX (US); Youn Hyoung Heo, Seoul (KR); Richard Burbidge, Shrivenham (GB)

(73) Assignee: Apple Inc., Cupertino, CA (US)

(*) Notice: Subject to any disclaimer, the term of this patent is extended or adjusted under 35 U.S.C. 154(b) by 94 days.

(21) Appl. No.: 15/566,650

(22) PCT Filed: Dec. 9, 2015

(86) PCT No.: PCT/US2015/064833
§ 371 (c)(1),
(2) Date: Oct. 13, 2017

(87) PCT Pub. No.: WO2016/182597
PCT Pub. Date: Nov. 17, 2016

(65) Prior Publication Data
US 2018/0098370 A1    Apr. 5, 2018

Related U.S. Application Data

(60) Provisional application No. 62/161,761, filed on May 14, 2015.

(51) Int. Cl.
*H04W 76/14* (2018.01)
*H04W 4/02* (2018.01)
(Continued)

(52) U.S. Cl.
CPC .......... *H04W 76/14* (2018.02); *H04W 4/023* (2013.01); *H04W 76/27* (2018.02); *H04W 88/04* (2013.01); *H04W 8/005* (2013.01); *H04W 72/08* (2013.01)

(58) Field of Classification Search
CPC ..... H04W 76/14; H04W 76/27; H04W 4/023; H04W 88/04; H04W 8/005
See application file for complete search history.

(56) References Cited

U.S. PATENT DOCUMENTS 10,492,120 B2  11/2019  Yasukawa et al.
10,568,154 B2   2/2020  Aminaka et al.
(Continued)

FOREIGN PATENT DOCUMENTS

CN    104080097 A    10/2014
CN    104105158 A    10/2014
(Continued)

OTHER PUBLICATIONS

3GPP TSG RAN WG2 Meeting #89bis (R2-151111); Considerations on UE-to-NW Relay for ProSe; Agenda Item: 7.5.2; Bratislava, Slovakia; Apr. 20-24, 2015.
(Continued)

*Primary Examiner* — Rhonda L Murphy

(57) ABSTRACT

Technology for a relay user equipment (UE) operable to act as a relay between a remote UE and an eNodeB is disclosed. The relay UE can receive, from the eNodeB, a relay configuration message that includes one or more relay configuration parameters. The relay UE can identify relay UE information associated with one or more relay parameters of the relay UE. The relay UE can determine to act as the relay for the remote UE based on the one or more relay configuration parameters and the relay UE information. The relay UE can transmit a discovery message to the remote UE in order to establish a direct connection between the relay UE and the remote UE, wherein the relay UE is configured to relay data from the eNodeB to the remote UE via the direct convection between the relay UE and the remote UE.

19 Claims, 17 Drawing Sheets

(51) Int. Cl.
    *H04W 88/04*     (2009.01)
    *H04W 76/27*     (2018.01)
    *H04W 8/00*      (2009.01)
    *H04W 72/08*     (2009.01)

(56) References Cited

U.S. PATENT DOCUMENTS

| | | | | |
|---|---|---|---|---|
| 2014/0051473 | A1* | 2/2014 | Weigand | H04L 41/06 |
| | | | | 455/515 |
| 2014/0171062 | A1* | 6/2014 | Fallgren | H04W 40/22 |
| | | | | 455/422.1 |
| 2016/0227518 | A1* | 8/2016 | Li | H04W 72/042 |
| 2016/0353307 | A1* | 12/2016 | Jung | H04W 24/10 |
| 2018/0092017 | A1* | 3/2018 | Freda | H04B 7/155 |
| 2018/0124674 | A1* | 5/2018 | Vutukuri | H04W 40/22 |
| 2018/0352411 | A1* | 12/2018 | Ryu | H04W 40/24 |

FOREIGN PATENT DOCUMENTS

| | | |
|---|---|---|
| WO | 2013131234 A1 | 9/2013 |
| WO | 2015004142 A1 | 1/2015 |
| WO | 2015047167 A1 | 4/2015 |

OTHER PUBLICATIONS

3GPP TR 23.703 V12.0.0; Study on architecture enhancements to support Proximity-based Services (ProSe) (Release 12) (Feb. 2014).
U.S. Appl. No. 16/408,092, Non-Final Office Action, dated Sep. 1, 2020, 16 pages.

* cited by examiner

```
-- ASN1START

SystemInformationBlockTypex ::=    SEQUENCE { relayOperationSupported              ENUMERATED {On, Off}    OPTIONAL, relayConfigurationInfo      SEQUENCE {
    s-relay                  RelayThreshold1    OPTIONAL,   -- Need OP
    threshRelayUpper         RelayThreshold2    OPTIONAL,   -- Need OP
    relayMobilityConfig      MobilityParameter, OPTIONAL,
    initiateRelayfromIdle    ENUMERATED {On}    OPTIONAL

}

}
-- ASN1STOP
```

```
-- ASN1START

<PORTIONS OMITTED FOR BREVITY>

SidelinkUEInformation-r13 ::=        SEQUENCE {
   criticalExtensions               CHOICE {
      c1                            CHOICE {
         sidelinkUEInformation-r13    SidelinkUEInformation-r13-IEs,
         spare3 NULL, spare2 NULL, spare1 NULL
      },
      criticalExtensionsFuture      SEQUENCE {}
   }
}

SidelinkUEInformation-r13-IEs ::=   SEQUENCE {
   relayInterest-r13                ENUMERATED {true}         OPTIONAL,

}

<PORTIONS OMITTED FOR BREVITY>
-- ASN1STOP
```

FIG. 10

```
-- ASN1START

SidelinkUERelayInterestIndication-r13 ::=    SEQUENCE {
   criticalExtensions               CHOICE {
      c1                            CHOICE {
         interestIndication-r11       SidelinkUERelayInterestIndication-r13-IEs,
         spare3 NULL, spare2 NULL, spare1 NULL
      },
      criticalExtensionsFuture      SEQUENCE {}
   }
}

SidelinkUERelayInterestIndication-r13-IEs ::= SEQUENCE {
   relayInterest-r13                ENUMERATED {true}         OPTIONAL,
   lateNonCriticalExtension         OCTET STRING              OPTIONAL,
   nonCriticalExtension             SEQUENCE {}               OPTIONAL
}

-- ASN1STOP
```

FIG. 11

```
-- ASN1START

<PORTIONS OMITTED FOR BREVITY>

RRCConnectionReconfiguration-v13xx-IEs ::= SEQUENCE { sl-RelayConfig-r13          SL-RelayConfig-r13          OPTIONAL, --
Need ON
    nonCriticalExtension        SEQUENCE {}                 OPTIONAL
}
<PORTIONS OMITTED FOR BREVITY>

-- ASN1STOP
```

```
-- ASN1START

<PORTIONS OMITTED FOR BREVITY>
SL-DiscConfig-r13 ::=                      SEQUENCE {
    relaySelectionInfo-r13                 SEQUENCE {
        SL-directLink-q-RxLevMin                       Q-RxLevMin,
        SL-directLink-q-RxLevMinOffset                 INTEGER (1..8)
    OPTIONAL  -- Need OP
    }

}
<PORTIONS OMITTED FOR BREVITY>

-- ASN1STOP
```

FIG. 15

```
-- ASN1START

<PORTIONS OMITTED FOR BREVITY>
SL-DiscConfig-r13 ::=                      SEQUENCE {
    relaySelectionInfo-r13                 SEQUENCE {
        SL-relayDiscoveryInitiate                  ENUMERATE {true}
OPTIONAL  -- Need OP
    }

}
<PORTIONS OMITTED FOR BREVITY>

-- ASN1STOP
```

FIG. 16

UE-TO-NETWORK RELAY INITIATION AND CONFIGURATION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 10 is abstract syntax notation (ASN) code describing a sidelink user equipment (UE) information message in accordance with an example;

FIG. 11 is abstract syntax notation (ASN) code describing a sidelink user equipment (UE) relay interest indication message in accordance with an example;

FIG. 15 is abstract syntax notation (ASN) code describing a sidelink discovery configuration information element (IE) in accordance with an example;

FIG. 16 is abstract syntax notation (ASN) code describing a sidelink discovery configuration information element (IE) in accordance with an example;

Figure 1:
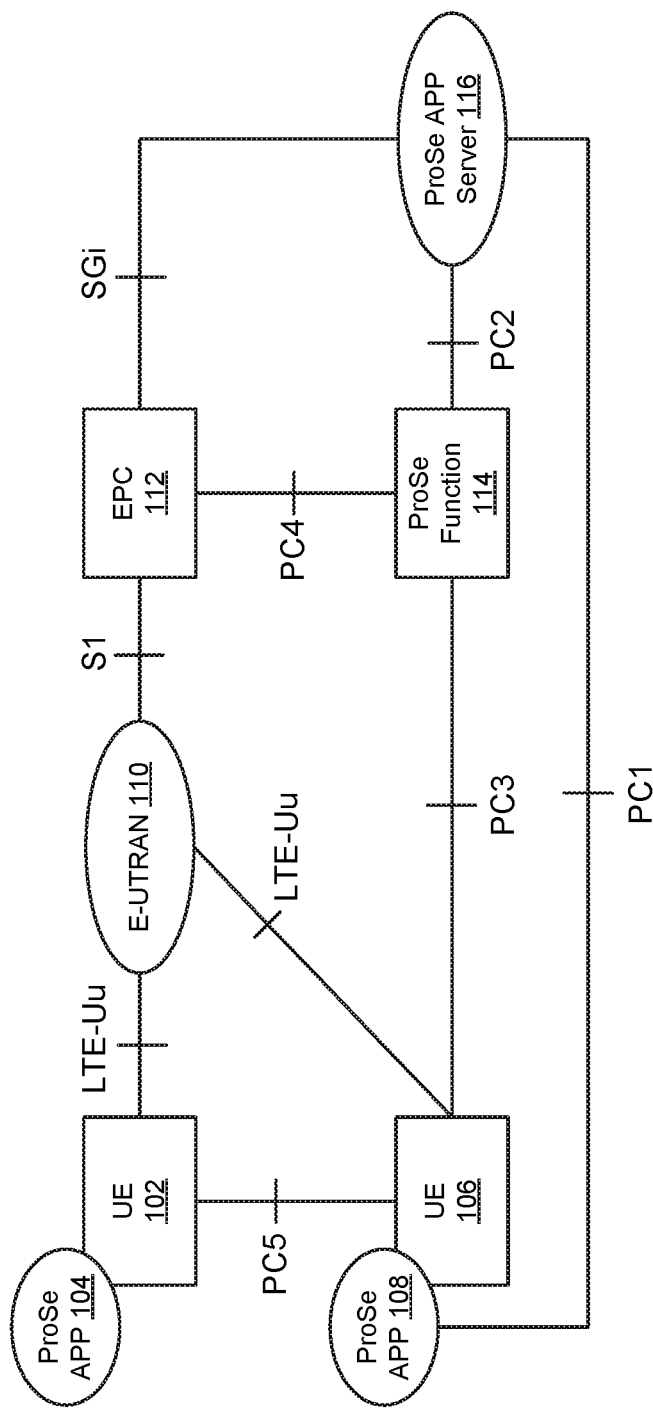
FIG. 1 illustrates a device-to-device (D2D) discovery and communication architecture in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Device to device (D2D) communication for Evolved Universal Terrestrial Radio Access (E-UTRA) or Long Term Evolution (LTE) is being standardized as of 3GPP LTE Release 12. D2D feature enables the direct communication of data between user equipments (UEs) over the cellular radio spectrum, but without the data being carried by the cellular network infrastructure. Within 3GPP, the D2D communication feature can be referred to as ProSe (Proximity Services) Direct Communication. In Release 12 and 13, D2D is primarily targeted for public safety use cases. Therefore, public safety workers can communicate with each other using radio frequency (RF) communications when there is no LTE connection available. In this use case, there is no reliance on network coverage. However, for future releases, commercial applications of D2D are also considered.

In Release 12, there are several D2D features that are covered, such as ProSe device to device discovery in network coverage. ProSe discovery refers to the process by which one UE detects and identifies another UE in proximity using E-UTRAN radio signals. Other D2D features include ProSe device to device broadcast communication, and higher layer (e.g., access stratum (AS) layer) support to enable groupcast (e.g., broadcast or multicast) and unicast over a physical layer broadcast communication.

FIG. 1 illustrates an exemplary device-to-device (D2D) discovery and communication architecture. More specifically, FIG. 1 illustrates a D2D/ProSe non-roaming reference architecture. A first UE 102 can be connected to a E-UTRAN 110 over a first LTE-Uu interface, and a second UE 106 can be connected to the E-UTRAN 110 over a second LTE-Uu interface. The first UE 102 can execute a first ProSe application 104 and the second UE 106 can execute a second ProSe application 108. The first UE 102 and the second UE 106 can be connected via a PC5 interface. In other words, the PC5 interface is the communication link between the two ProSe enabled UEs 102, 106 in direct communication.

In one example, the E-UTRAN 110 can be connected to an Evolved Packet Core (EPC) 112 via an S1 interface. The EPC 112 can be connected to a ProSe function 114 via a PC4 interface, and the EPC 112 can be connected to a ProSe application server 116 over an SGi interface. The ProSe function 114 and the ProSe application server 116 can be connected via a PC2 interface. In addition, one of the UEs can be connected to the ProSe function 114 and the ProSe application server 116. For example, the second UE 106 can be connected to the ProSe function 114 over a PC3 interface, and the second ProSe application 108 that executes on the second UE 106 can be connected to the ProSe application server 116 via a PC1 interface.

Release 13 aims to introduce enhancements to LTE D2D communications and discovery meeting requirements for public safety for: (1) in-network coverage (intra-cell and inter-cell), (2) partial network coverage, and (3) outside network coverage scenarios. For non-public safety discovery, the enhancements to LTE D2D communications can be for in-network coverage (intra-cell and inter-cell).

In addition, Release 13 aims to support the extension of network coverage using layer 3 (L3)-based ProSe UE-to-Network Relays. A ProSe UE-to-Network relay can also be referred to as a relay UE. The relay UE can perform a ProSe UE-to-Network Relay function, which supports the relay of unicast traffic to remote UEs that are not served by the E-UTRAN and the network. In other words, the relay UE can act as a relay between the network and the remote UE that is out-of-coverage. The relay UE will be in-coverage with the network in order to forward the data to the out-of-coverage remote UE. The relay UE can relay unicast traffic in both uplink (UL) and downlink (DL). In other words, the relay UE can forward information from the remote UE in uplink to the network, as well as forward information from the network in downlink to the remote UE. The relay UE can enhance coverage to UEs that are outside the network. The relay UE can provide a generic L3 forwarding function that can relay Internet Protocol (IP) traffic that is relevant for public safety communication. In addition, the relay UE can relay IP traffic (e.g., voice data, video data) to support service continuity for the remote UE.

In one example, the network (e.g., an eNodeB) can control the initiation of the ProSe UE-to-Network Relay feature. The eNodeB can control the initiation of the ProSe UE-to-Network Relay feature per cell or per relay UE or both. The relay UE can be initiated or configured to act as a relay while a connection is established between the relay UE and the network. A given UE (i.e., the remote UE) can (re)select the relay UE, and then a connection can be established between the remote UE and the relay UE. At this point, the relay UE can forward data from the network to the remote UE, or vice versa.

As described in greater detail below, the relay UE can be initiated and/or configured to act as a relay via a generic network configuration in a system information block (SIB). The relay UE can determine to act as a relay based on a relay configuration message received from the network, or alternatively, the network can instruct the relay UE to act as a relay using the relay configuration message. In other words, a given UE can determine to act as a relay UE, or can be instructed to act as a relay UE. As described in greater detail below, the remote UE can move from in-coverage to out of coverage. In other words, the remote UE can initially be connected to the network, but after the remote UE moves out of coverage, the remote UE can connect to a relay UE and communicate with the network via the relay UE. The actions performed by the remote UE after moving out of coverage can be initiated by the remote UE, or by the relay UE or the eNodeB. As described in greater detail below, the relay UE can initiate a relay discovery and selection procedure in order to connect with the remote UE. In one example, the relay UE can act as a relay only when its network connection channel quality is above a defined threshold, and the remote UE can only perform a relay selection procedure when its network connection channel quality is below a defined threshold.

Figure 2:
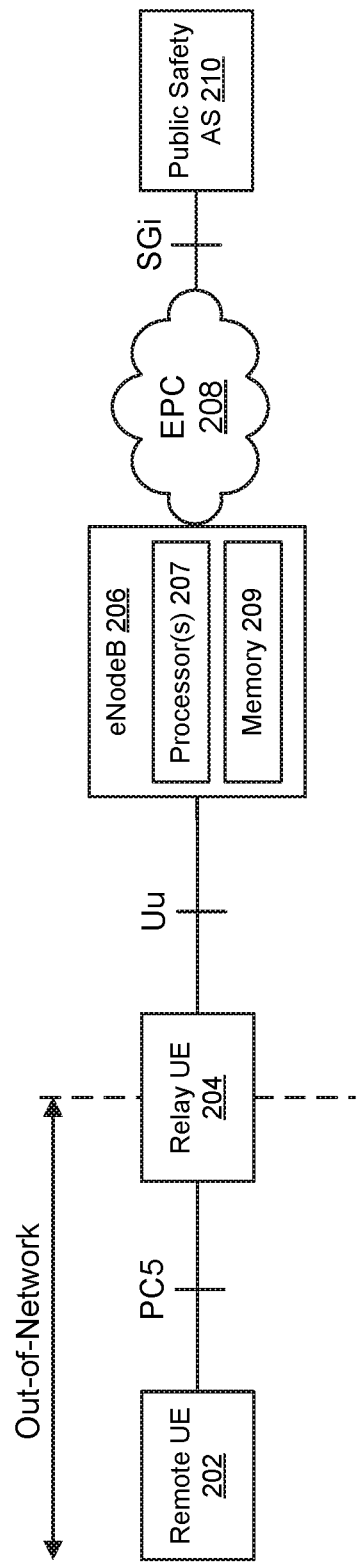
FIG. 2 illustrates a relay user equipment (UE) acting as a relay between a remote UE and an eNodeB in accordance with an example.

FIG. 2 illustrates an example of a relay user equipment (UE) 204 acting as a relay between a remote UE 202 and an eNodeB 206. The eNodeB 206 can include processor(s) 207 and memory 209. The relay UE 204 can also be referred to as a ProSe UE-to-Network Relay. The relay UE 204 can be connected to the eNodeB 206 via a Uu interface. Therefore, the relay UE 204 can be in-coverage with respect to the network. The remote UE 202 can be out-of-coverage. The remote UE 202 may not be directly connected to the eNodeB 206, but rather is directly connected to the relay UE 204 via a PC5 interface. The relay UE 204 can act as an intermediary between the remote UE 202 that is out-of-coverage and the eNodeB 206. The eNodeB 206 can be part of an Evolved Packet Core (EPC) 208, and the eNodeB 206 can be connected to a public safety application server (AS) 210 via an SGi interface.

In one example, the relay UE 204 can be configured for relaying by the eNodeB 206. The configured relay operation can include both discovery and one-to-one communication between the relay UE 204 and the remote UE 202, or the configured relay operation can include only one-to-one communication if the Access Stratum (AS) layer cannot distinguish if the discovery message is delivered for the ProSe UE-to-Network Relay procedure or for another type of procedure (e.g., group member discovery). In one example, the configurations below can be sent via the Access Stratum (AS) layer because if the eNodeB 206 is to have tight control over these procedures, the eNodeB 206 can be aware that a given UE is initiating a UE-to-Network Relay discovery in advance of the message.

In one configuration, as part of initiating the UE-to-Network relay operation, the eNodeB 206 can broadcast a generic network configuration message to a plurality of UEs. In particular, the eNodeB 206 can broadcast a relay configuration information message that contains certain cell specific information. The relay configuration information message can be part of a novel system information block (SIB) that is broadcast from the eNodeB 206 to the plurality of UEs, or the relay configuration information message can be part of an existing SIB that is broadcast from the eNodeB 206 to the plurality of UEs. In one example, the relay configuration information message can include various generic relay-related cell-wide configuration parameters (or relay configuration parameters), such as an s-relay parameter (threshold relay lower), a threshold relay upper parameter, a relay mobility configuration parameter, an initiate relay from idle parameter, and a relay operation supported parameter.

In one example, the s-relay parameter (threshold relay lower) can represent a Uu link quality threshold above which a given UE can act as a relay. In other words, the given UE can have a link quality of a certain level in order to support acting as a relay for the remote UE 202. The Uu link quality threshold can be a Reference Signal Received Power (RSRP) and/or a Reference Signal Received Quality (RSRQ) threshold. The s-relay parameter (threshold relay lower) can be used to ensure that UEs in poor coverage situations do not become relays, thereby avoiding excess use of the cell's resources to carry the relayed traffic between the eNodeB 206 and the relay UE 204. In one example, the s-relay parameter can be defined as thresholdLowRelayUE or discoveryThresholdLowRelayUE or in a similar manner. The s-relay parameter can be a lower threshold above which a particular UE can act as a relay, and the threshold upper parameter is a parameter below which a particular UE can act as a relay and above which the particular UE cannot act as a relay. In other words, both the s-relay parameter and the threshold upper parameter provide a range within which a particular UE can act as a relay.

In one example, the threshold relay upper parameter can represent an upper threshold of Uu link quality above which a given UE cannot act as a relay. The threshold relay upper parameter can be used to prevent UEs located in proximity to the cell center from becoming relays. UEs located in proximity to the cell center are unlikely to be useful for the purpose of relaying traffic from remote UEs that are out of coverage, and therefore, the resource usage and interference associated with discovery announcements can be avoided.

In one example, the relay mobility configuration parameter can represent an acceptable mobility state for a given UE to act as a relay. For example, if the relay mobility configuration parameter is set to "low," then this indicates that the given UE can be a low mobility UE in order to act as a relay.

In one example, the initiate relay from idle parameter can be set to "ON" or "OFF." When set to "ON," the UE may initiate relay operation while being in idle mode, and conversely, when set to "OFF," the UE may not initiate relay operation while being in idle mode. In other words, when set to "OFF," the UE should go to the connected mode to initiate relay operation. Alternatively, instead of the initiate relay from idle parameter, if there is no relay configuration information and the eNodeB 206 supports relay operation, a given UE can implicitly assume to go to the connected mode to enable relay operation.

In one example, the relay operation supported parameter can represent whether the cell supports relay operation. For example, the relay operation supported parameter can be set to "YES" when the cell supports relay operation, and conversely, the relay operation supported parameter can be set to "NO" when the cell does not support relay operation. The presence of relay related parameters can also be an indication that the relay operation is supported in the cell.

As described in further detail below, the eNodeB 206 can broadcast the relay configuration information message with the relay configuration parameters to the relay UE 204. The relay configuration parameters can include the s-relay parameter (threshold relay lower), the threshold relay upper parameter, the relay mobility configuration parameter, the initiate relay from idle parameter, and the relay operation supported parameter. Based on the relay configuration parameters included in the relay configuration information message, the relay UE 204 can decide to act as a relay. Alternatively, after the relay UE 204 receives the relay configuration parameters included in the relay configuration information message can instruct the relay UE 204 to act as a relay. In other words, in a first scenario, the relay UE 204 decides to act as a relay, and in a second scenario, the eNodeB 206 decides for the relay UE 204 to act as a relay.

Figures 3, 4:
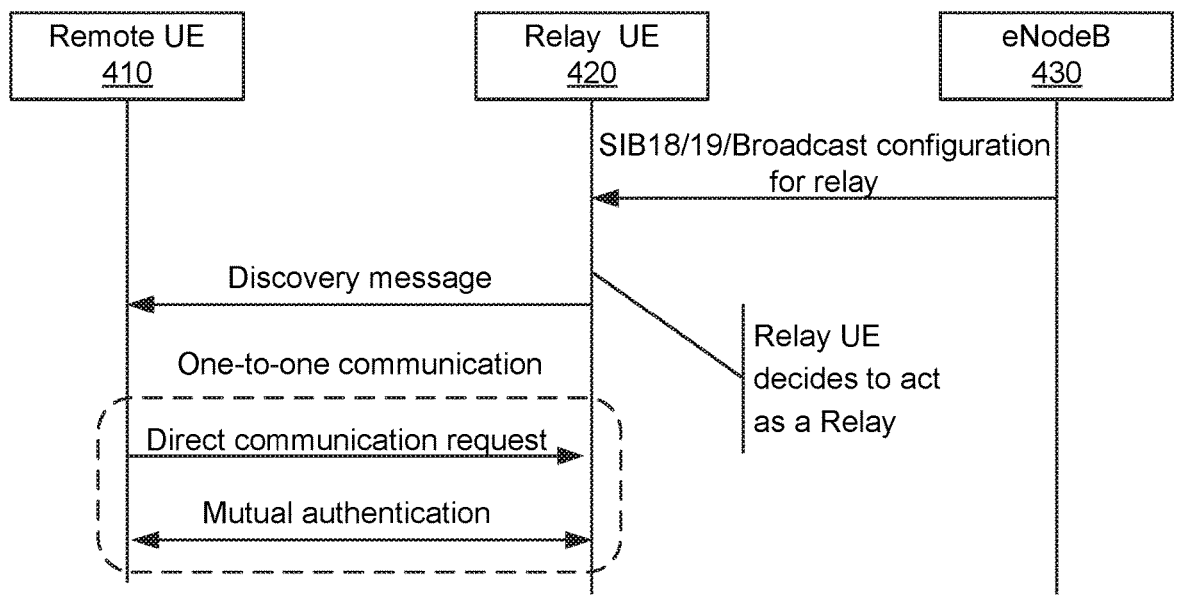
FIG. 3 is abstract syntax notation (ASN) code describing a system information block (SIB) in accordance with an example.
FIG. 4 illustrates signaling that enables a relay user equipment (UE) to act as a relay between an eNodeB and a remote UE in accordance with an example.

FIG. 3 is exemplary abstract syntax notation (ASN) code describing a novel system information block (SIB). The SIB can be broadcast from an eNodeB to a relay UE. The SIB can include a relay operation supported parameter. In addition, the SIB can include a relay configuration information message that contains a number of relay configuration parameters. The relay configuration parameters can include an s-relay parameter (threshold relay lower), a threshold relay upper parameter, a relay mobility configuration parameter, and an initiate relay from idle parameter.

FIG. 4 illustrates exemplary relay initiation signaling that enables a relay user equipment (UE) 420 to act as a relay between an eNodeB 430 and a remote UE 410. The eNodeB 430 can broadcast a relay configuration information message to the relay UE 420. The relay configuration information message can be included in a system information block (SIB) 18, a SIB 19 or another SIB. The relay configuration information message can include various relay configuration parameters, such as an s-relay parameter (threshold relay lower), a threshold relay upper parameter, a relay mobility configuration parameter, and an initiate relay from idle parameter.

Based on the relay configuration parameters included in the relay configuration information message (and UE internal information), the relay UE 420 can determine whether or not to initiate the relay functionality. After the relay UE 420 determines to act as a relay, the relay UE 420 can transmit a discovery message to the remote UE 410. The discovery message can announce or advertise that the relay UE 420 is acting as a relay, and that the relay UE 420 is ready to receive a direct communication request from the remote UE 410. After transmission of the discovery message from the relay UE 420 to the remote UE 410, one-to-one communication can take place between the relay UE 420 and the remote UE 410. For example, the remote UE 410 can communicate the direct communication request message to the relay UE 420, and the remote UE 410 and the relay UE 420 can perform a mutual authentication procedure.

As shown in FIG. 4, other than the setting of the broadcast configuration parameters, the eNodeB 430 has no involvement in the relay UE's decision on whether to become a relay. In other words, the relay UE 420 is autonomous in making the decision on whether or not to act as a relay based on the relay configuration parameters.

In one example, the relay UE 420 can determine whether to act as a relay based on the UE internal information. The UE internal information can include measurements (e.g., RSRP and/or RSRQ measurements) of the serving cell to compare with thresholds that are provided as part of the relay configuration parameters. In other words, the relay UE 420 can compare its own measurements with the thresholds included in the s-relay parameter (threshold relay lower) and the threshold relay upper parameter, and based on this comparison, the relay UE 420 can determine whether or not to act as a relay. In one example, the UE internal information can include battery status information. For example, the relay UE 420 may only decide to act as a relay if the relay UE's battery status is above a certain threshold, or if the relay UE 420 is connected to a permanent power supply. In one example, the UE internal information can include user input information. For example, the relay UE 420 may only decide to act as a relay if a user/upper layer configures a setting on the relay UE 420 to enable the relay functionality. Therefore, the relay UE 420 can use the UE internal information in combination with the relay configuration parameters when determining whether or not to act as a relay.

Figure 5:
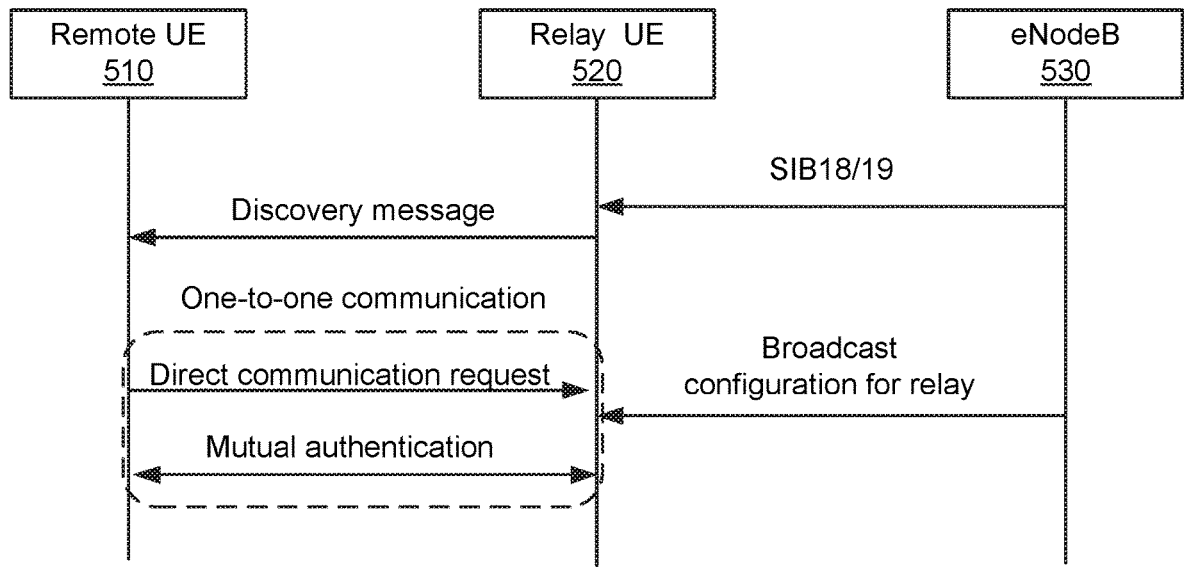
FIG. 5 illustrates signaling that enables a relay user equipment (UE) to act as a relay between an eNodeB and a remote UE in accordance with an example.

FIG. 5 illustrates exemplary relay initiation signaling that enables a relay user equipment (UE) 520 to act as a relay between an eNodeB 530 and a remote UE 510. The eNodeB 530 can broadcast a system information block (SIB) 18 or a SIB 19 to the relay UE 520. In this configuration, the SIB 18 or SIB 19 may or may not include a relay configuration information message with relay configuration parameters. After the relay UE 520 receives the SIB 18 or SIB 19 from the eNodeB 530, the relay UE 520 communicates a discovery message to the remote UE 510. At this point, the relay UE 520 sends the discovery message merely to initiate device-to-device (D2D) communications with the remote UE 510, and not to act as a relay for the remote UE 510. After transmission of the discovery message from the relay UE 520 to the remote UE 510, one-to-one communication can take place between the relay UE 520 and the remote UE 510. For example, the remote UE 510 can communicate a direct communication request message to the relay UE 520.

If the relay configuration is not broadcast in SIB18/19, at this point, the eNodeB 530 can separately broadcast a relay configuration message with relay configuration parameters to the relay UE 520. Based on the relay configuration parameters and UE internal information, the relay UE 520 can determine whether or not to act as a relay for the remote UE 510. In addition, the remote UE 510 and the relay UE 520 can perform a mutual authentication procedure. After the mutual authentication procedure, the relay UE 520 can either be acting as a relay for the remote UE 510, or the relay UE 520 may simply perform D2D communications with the remote UE 510 without acting as a relay.

One difference between FIG. 4 and FIG. 5 is when the relay UE determines to act as a relay. In FIG. 4, the relay UE decides to act as a relay before sending the discovery message to the remote UE. For this option, the AS layer can reject the request from the upper layer if the discovery message is for the relay UE, but the relay UE cannot perform relay operation according to the eNodeB's broadcast configuration. In FIG. 5, the relay UE can determine to act as a relay after the discovery message is sent to the remote UE. In FIG. 5, the AS layer can reject the request from the upper layer if one-to-one communication is enabled. In one example, the signaling shown in FIG. 4 can be more beneficial from the UE perspective, as it can avoid announcing/monitoring discovery message from UEs that cannot perform the UE-to-NW relay operation.

Figure 6:
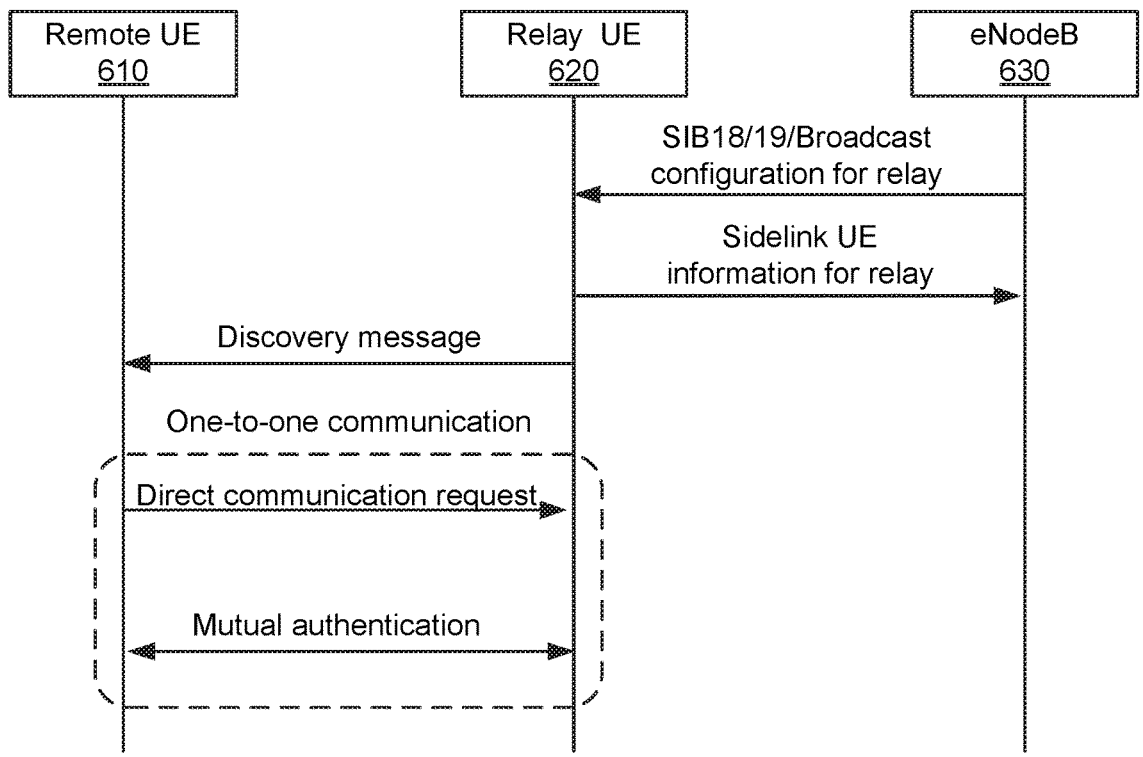
FIG. 6 illustrates signaling that enables a relay user equipment (UE) to act as a relay between an eNodeB and a remote UE in accordance with an example.

FIG. 6 illustrates exemplary relay initiation signaling that enables a relay user equipment (UE) 620 to act as a relay between an eNodeB 630 and a remote UE 610. The eNodeB 630 can broadcast a relay configuration information message to the relay UE 620. The relay configuration information message can be included in a system information block (SIB) 18, a SIB 19 or another SIB. The relay configuration information message can include various relay configuration parameters, such as an s-relay (threshold relay lower) parameter, a threshold relay upper parameter, a relay mobility configuration parameter, and an initiate relay from idle parameter.

Based on the relay configuration parameters and UE internal information, the relay UE 620 can determine to act as a relay for the remote UE. The relay UE 620 can communicate a sidelink UE information message to the eNodeB 630, wherein the sidelink UE information message indicates the relay UE's intent to act as a relay for the remote UE 610. In this configuration, the relay UE 620 makes the decision on whether to act as a relay as opposed to the eNodeB 630.

After the relay UE 620 determines to act as a relay, the relay UE 620 can transmit a discovery message to the remote UE 610. The discovery message can announce that the relay UE 620 is acting as a relay, and that the relay UE 620 is ready to receive a direct communication request from the remote UE 610. After transmission of the discovery message from the relay UE 620 to the remote UE 610, one-to-one communication can take place between the relay UE 620 and the remote UE 610. For example, the remote UE 610 can communicate the direct communication request message to the relay UE 620, and the remote UE 610 and the relay UE 620 can perform a mutual authentication procedure.

Figure 7:
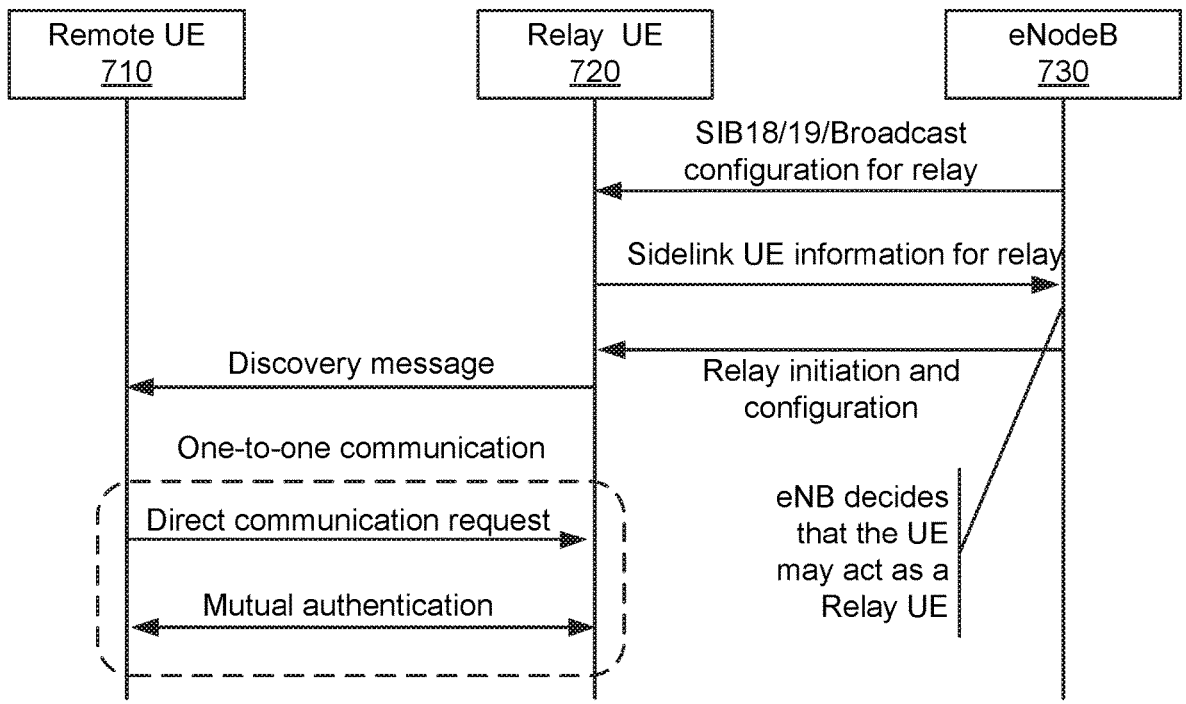
FIG. 7 illustrates signaling that enables a relay user equipment (UE) to act as a relay between an eNodeB and a remote UE in accordance with an example.

FIG. 7 illustrates exemplary relay initiation signaling that enables a relay user equipment (UE) 720 to act as a relay between an eNodeB 730 and a remote UE 710. The eNodeB 730 can broadcast a relay configuration information message to the relay UE 720. The relay configuration information message can be included in a system information block (SIB) 18, a SIB 19 or another SIB. The relay configuration information message can include various relay configuration parameters, such as an s-relay parameter (threshold relay lower) a threshold relay upper parameter, a relay mobility configuration parameter, and an initiate relay from idle parameter.

The relay UE 720 can determine whether or not it is interested to act as a relay based on the relay configuration parameters and UE internal information. The relay UE 720 can communicate a sidelink UE information message to the eNodeB 730, wherein the sidelink UE information message indicates whether or not the relay UE 720 is interested in acting as a relay. In this configuration, the relay UE 720 does not make the decision on whether or not to act as a relay. Rather, the eNodeB 730 receives the sidelink UE information message with the relay UE's interest in acting as a relay, and then the eNodeB 730 makes a final determination on whether the relay UE 720 should enable its relay functionality. If the eNodeB 730 determines that the relay UE 720 is to act as a relay, the eNodeB 730 can communicate a relay initiation and configuration message to the relay UE 720. The relay initiation and configuration message can be dedicated signaling that is specific to the relay UE 720 (i.e., not broadcast). In some cases, the eNodeB 730 can merely send an acknowledgement (ACK) to the relay UE 720 indicating that the relay UE 720 is permitted to act as a relay.

After reception of the relay initiation and configuration message (or an ACK), the relay UE 720 can communicate a discovery message to the remote UE 710. The discovery message can announce that the relay UE 720 is acting as a relay, and that the relay UE 720 is ready to receive direct communication requests from remote UEs. The remote UE 710 can communicate a direct communication request to the relay UE 720, and then the remote UE 710 and the relay UE 720 can perform a mutual authentication procedure.

In this configuration, (i.e., when the eNodeB determines for the relay UE to act as a relay), an increased amount of signaling overhead may occur. However, such an approach enables the eNodeB to have greater control over which UEs become relays. For example, the eNodeB may want to limit the number of UEs that become relays in order to reduce the overhead associated with discovery message transmissions from the relay UEs.

Figure 8:
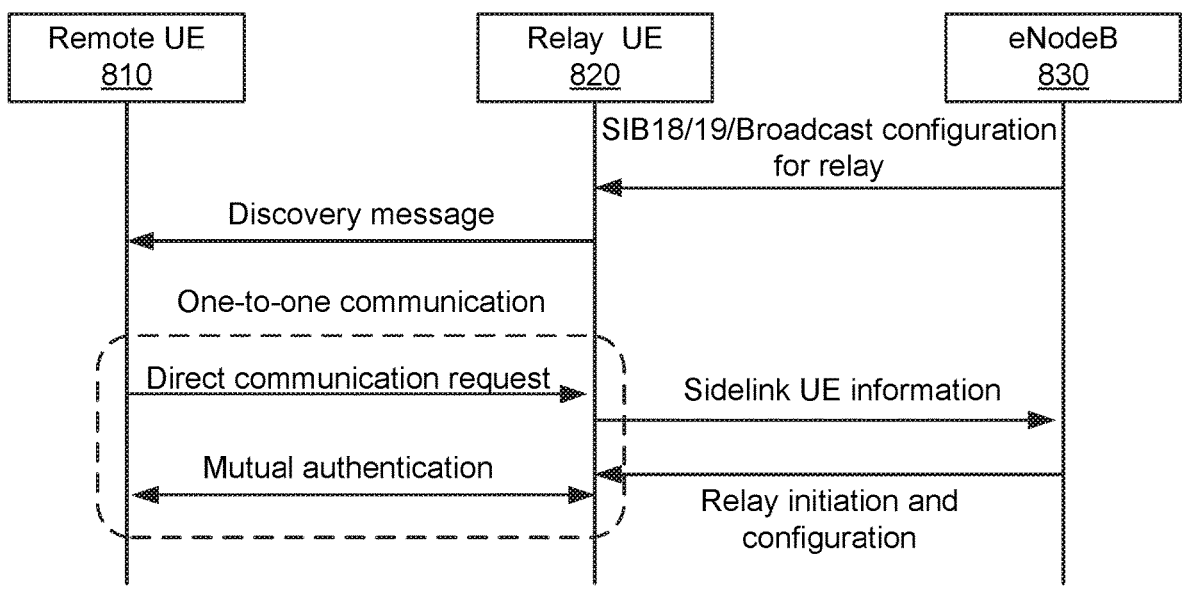
FIG. 8 illustrates signaling that enables a relay user equipment (UE) to act as a relay between an eNodeB and a remote UE in accordance with an example.

FIG. 8 illustrates exemplary relay initiation signaling that enables a relay user equipment (UE) 820 to act as a relay between an eNodeB 830 and a remote UE 810. The eNodeB 830 can broadcast a relay configuration information message to the relay UE 820. The relay configuration information message can be included in a system information block (SIB) 18, a SIB 19 or another SIB. The relay configuration information message can include various relay configuration parameters. At this point, the relay UE 820 may not be acting as a relay. The relay UE 820 can transmit a discovery message to the remote UE 810. The discovery message may be to initiate D2D communication between the relay UE 820 and the remote UE 810. The remote UE 810 can transmit a direct communication request to the relay UE 820.

After the discovery message and the direct communication request are communicated, the relay UE 820 can transmit a sidelink UE information message to the eNodeB 830, wherein the sidelink UE information message indicates that the relay UE 820 is interested in acting as a relay. The eNodeB 830 can determine whether or not the relay UE 820 is to act as a relay, and if so, the eNodeB 830 can communicate a relay initiation and configuration message to the relay UE 820. The relay initiation and configuration message can be dedicated signaling that is specific to the relay UE 820 (i.e., not broadcast). In addition, the remote UE 810 and the relay UE 820 can perform a mutual authentication procedure. At this point, the relay UE 820 can be configured to act as a relay for the remote UE 810.

In this configuration, the relay UE 820 may have to obtain eNodeB authorization for each UE-to-Network relay connection, or when relay operation is actually initiated upon the direct communication request message rather than the discovery message.

Figure 9:
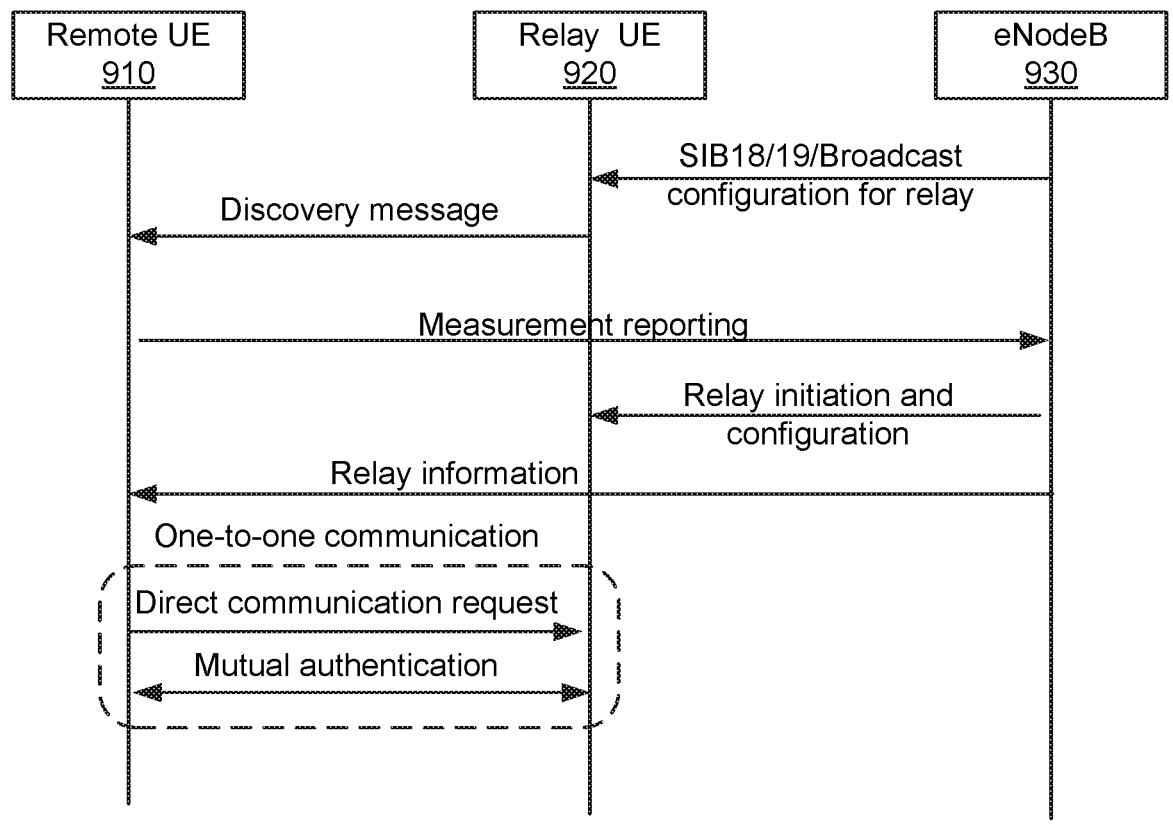
FIG. 9 illustrates signaling that enables a relay user equipment (UE) to act as a relay between an eNodeB and a remote UE in accordance with an example.

FIG. 9 illustrates exemplary relay initiation signaling that enables a relay user equipment (UE) 920 to act as a relay between an eNodeB 930 and a remote UE 910. The remote UE 910 can initially be in-coverage of the eNodeB 930. In other words, at least initially, a connection can be established between the remote UE 910 and the eNodeB 930. The eNodeB 930 can broadcast a relay configuration information message to the relay UE 920. The relay configuration information message can be included in a system information block (SIB) 18, a SIB 19 or another SIB. The relay configuration information message can include various relay configuration parameters. At this point, the relay UE 920 may not be acting as a relay. The relay UE 920 can transmit a discovery message to the remote UE 910. The discovery message may be to initiate D2D communication between the relay UE 920 and the remote UE 910.

In one example, the remote UE 910 can send a measurement report to the eNodeB 930 via the connection that is established between the remote UE. Based on the measurement report, the eNodeB 930 can transmit a relay initiation and configuration message to the relay UE 920, which instructs the relay UE 920 to act as a relay for the remote UE 910. In other words, the eNodeB 930 may determine that the connection between the remote UE 910 and the eNodeB 930 is below a defined threshold based on the remote UE's measurement report. Therefore, the eNodeB 930 can instruct the relay UE 920 to act as a relay via the relay initiation and configuration message, which can be dedicated signaling that is specific to the relay UE 920 (i.e., not broadcast). Since the relay UE 920 has already received the relay configuration information message with the relay configuration parameters, the relay UE 920 can begin acting as a relay for the remote UE 910 after receiving the relay initiation and configuration message from the eNodeB 930.

In one example, the eNodeB 930 can communicate a relay information message to the remote UE 910. The relay information message may indicate that the relay UE 920 is to act as a relay for the remote UE 910. The remote UE 910 can send a direct communication request to the relay UE 920. After a mutual authentication procedure is performed between the remote UE 910 and the relay UE 920, the relay UE 920 can act as a relay between the remote UE 910 and the eNodeB 930. At this point, the remote UE 910 may still be within coverage (albeit at a poor connection with the eNodeB 930), or the remote UE 910 can be out-of-coverage.

In one configuration, relay initiation can be dynamically performed at a given UE (e.g., the relay UE). The relay UE can determine whether to act as a relay based on relay configuration parameters received from the eNodeB, as well as UE internal information. For example, if the relay UE determines that it satisfies various thresholds included in the relay configuration parameters, the relay UE can send dedicated signaling to the eNodeB to indicate that the relay UE is interested in acting like a relay. In other words, the relay UE can indicate an interest to act like a relay and request the eNodeB for permission to act as the relay. A trigger for the relay UE to send a new message or use an existing message to piggyback this request to act like a relay may be a relay configured by upper layers (e.g., upon initiation from an application). However, in this case, even though the relay UE initiates the relay operation, the eNodeB still makes a final determination on whether the relay UE is permitted to act as a relay.

FIG. 10 is exemplary abstract syntax notation (ASN) code describing a sidelink user equipment (UE) information message. The sidelink UE information message can be communicated from a relay UE to an eNodeB. The sidelink UE information message can include a relay interest parameter, which indicates whether or not the relay UE is interested in acting as a relay.

In one example, the sidelink UE information message can be an existing message that is used to communicate D2D-related UE specific information, and the sidelink UE information message may be re-utilized for the purpose of a UE-initiated relay operations. A given UE can send the sidelink UE information message to the eNodeB, wherein the sidelink UE information message includes a relay interest field. The relay interest field enables the given UE to indicate to the eNodeB an interest to act as a relay UE (i.e., to enable its relay functionality). For example, the given UE may include relay interest field if the UE's conditions for becoming a relay are met (e.g., based on the relay configuration parameters contained in a system information and UE internal information).

FIG. 11 is exemplary abstract syntax notation (ASN) code describing a sidelink user equipment (UE) relay interest indication message. The sidelink UE relay interest indication message can be communicated from a relay UE to an eNodeB. The sidelink UE relay interest indication message can include a relay interest parameter, which indicates whether or not the relay UE is interested in acting as a relay.

In one example, the sidelink UE relay interest indication message, which is specific to D2D, can be utilized for the purpose of UE-initiated relay operations. The sidelink UE relay interest indication message can be a new message that is added to 3GPP LTE Technical Specification (TS) 36.331. A given UE can send the sidelink UE relay interest indication message to the eNodeB, wherein the sidelink UE relay interest indication message includes the UE's relay interest indication to the eNodeB. The sidelink UE relay interest indication message can be provided to the eNodeB at any point during which the UE is in RRC connected mode.

In one example, the sidelink UE information message and the sidelink UE relay interest indication message can be similar to the sidelink UE information message communicated from the relay UE to the eNodeB, as described above with respect to FIGS. 7 and 8.

As described in further detail below, after the eNodeB receives the sidelink UE information message or the sidelink UE relay interest indication message from the relay UE, the eNodeB can respond with the appropriate relay configuration parameters. In other words, the UE relay initiation (in which a given UE indicates relay operation interest) can be followed by a UE-specific relay configuration, which is communicated from the eNodeB to the relay UE. The UE-specific relay configuration can be similar to the relay initiation and configuration message communicated from the eNodeB to the relay UE, as described above with respect to 7-9. In addition, the communication of the sidelink UE information message can allow for adjustment of any radio resource management (RRM) parameters at the eNodeB (e.g., the eNodeB may consider moving the relay UE to a different frequency).

In one configuration, based on the sidelink UE information message received from the relay UE, the eNodeB can initiate the UE's relay operation and provide UE-specific relay configuration information to the relay UE. The UE-specific relay configuration information can also be referred to as a relay initiation and configuration message.

In other scenarios, the eNodeB can communicate the relay initiation and configuration message to the relay UE in response to the remote UE's request for a relay UE, or in response to a remote UE's measurement report, as described earlier. In these scenarios, the relay UE may not send the sidelink UE information message to the eNodeB (which indicates an interest to act as a relay). Rather, without any signaling from a given UE, the eNodeB may transmit the relay initiation and configuration message to the given UE, and the given UE may begin acting as a relay for the remote UE.

In one example, the relay initiation and configuration message can be communicated from the eNodeB to the relay UE along with existing RRC messaging. For example, the relay initiation and configuration message can be part of an RRC connection reconfiguration message sent from the eNodeB to the relay UE. Alternatively, the relay initiation and configuration message can be a new message that is communicated from the eNodeB to the relay UE.

Figures 12, 13:
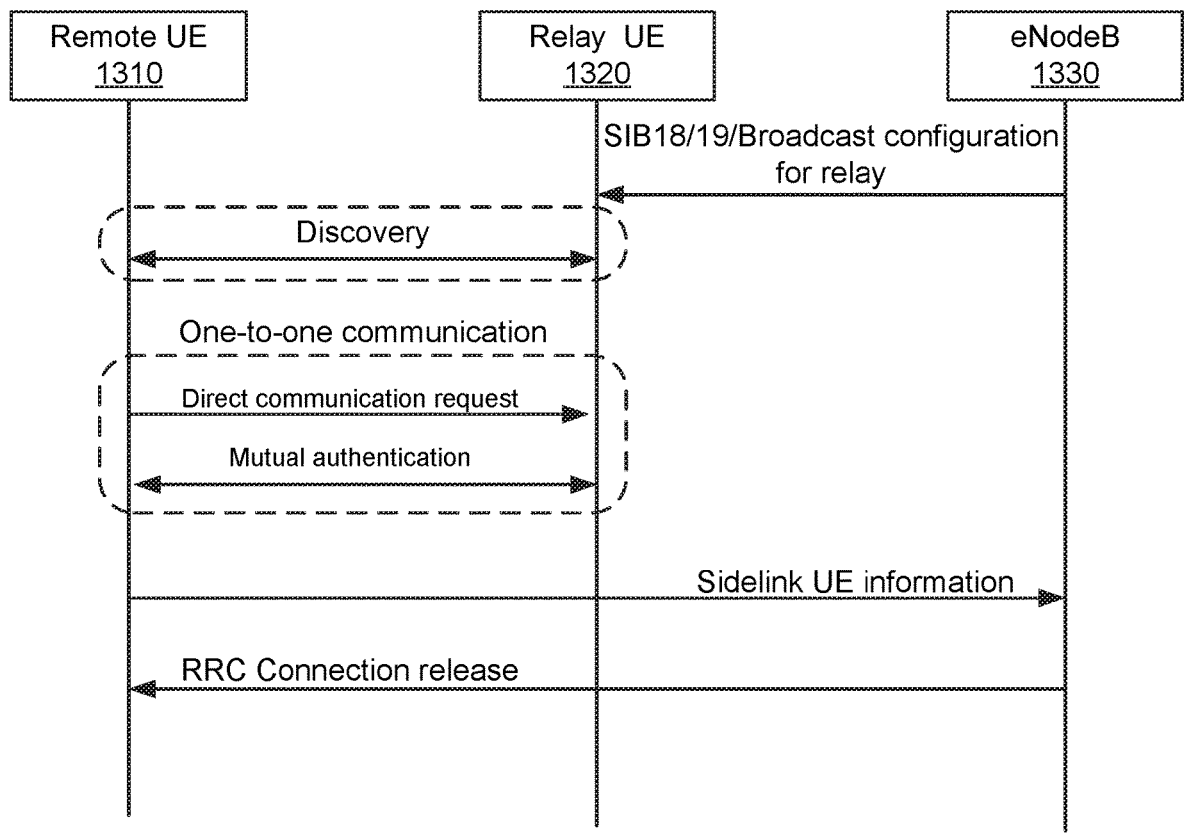
FIG. 12 is abstract syntax notation (ASN) code describing a radio resource control (RRC) connection reconfiguration message in accordance with an example.
FIG. 13 illustrates signaling that enables a relay user equipment (UE) to act as a relay between an eNodeB and a remote UE in accordance with an example.

FIG. 12 is exemplary abstract syntax notation (ASN) code describing a radio resource control (RRC) connection reconfiguration message. The RRC connection reconfiguration message can be communicated from an eNodeB to a relay UE, and used to initiate the UE's relay operation. When the eNodeB initiates the UE's relay operation in an existing RRC connection reconfiguration message, the RRC connection reconfiguration message can include a sidelink relay configuration field. The sidelink relay configuration field can include various parameters, such as a sidelink relay discovery start (SLrelayDiscoveryStart) parameter, a relay discovery periodicity (t_relayDiscoveryPeriodicity) parameter, a relay operation timer (t_relayOperationTimer) parameter, a sidelink maximum remote UE (SLmaxRemoteUEs) parameter, a sidelink relay resource configuration (SLrelayResourceConfiguration) parameter, a sidelink remote UE authorization (SLremoteUEAuthorization) parameter, and a sidelink relay control configuration (SLrelayControlConfiguration) parameter. Based on the reception of these parameters, the relay UE can be configured to act as a relay for a remote UE.

In one example, the sidelink relay discovery start (SLrelayDiscoveryStart) parameter can configure the UE to act as a relay (i.e., to enable its relay functionality). For example, the sidelink relay discovery start parameter can be set to "ON." In response to receiving the sidelink relay discovery start parameter, the relay UE can initiate the transmission of discovery announcement messages to remote UEs for relaying purposes.

In one example, the relay discovery periodicity (t_relayDiscoveryPeriodicity) parameter can indicate a frequency of relay discovery operation (e.g., a configurable timer). This parameter can indicate a periodicity of an announce procedure by the relay UE, wherein the relay UE performs the announce procedure to advertise itself as acting as a relay. In one example, even if the periodicity of the discovery message is defined in the upper layer, the access stratum (AS) layer can perform a retransmission of the relay discovery periodicity, e.g., in order to increase the reliability of the discovery message.

In one example, the relay operation timer (t_relayOperationTimer) parameter can include a timer indicating how long the relay UE is to act as a relay. In addition, the timer can indicate a duration for which the eNodeB's authorization for the relay UE to act as a relay is valid. The relay UE can operate in both idle mode and connected mode until expiry of the timer. In one example, the timer can be of a relatively long duration depending on the network configuration.

In one example, the sidelink maximum remote UE (SLmaxRemoteUEs) parameter can indicate a maximum number of remote UEs that can be supported by the relay UE. In Release 12, a relay UE can receive up to 16 sidelink processes, which implies that the relay UE is capable of supporting up to 16 remote UEs simultaneously. In some cases, the eNodeB can impose the relay UE to support fewer remote UEs depending on congestion and/or interference levels.

In one example, the sidelink relay resource configuration (SLrelayResourceConfiguration) parameter can indicate specific pool configuration information that the relay UE can use to communicate to the remote UE, which can potentially result in power savings. For example, this parameter can provide specific detailed resource configurations for the relay UE, and the relay UE may share this information with the remote UE or the in-coverage remote UE may also obtain this configuration via broadcast system information. This resource configuration may be used for an announcement of sidelink discovery in a same cell or inter-frequency cells.

In one example, the sidelink remote UE authorization (SLremoteUEAuthorization) parameter can provide authorization for the remote UE. If this parameter is set to "ON," then the relay UE does not have to forward a remote UE identifier (ID) to the eNodeB over a new sidelink message or an existing sidelink message. As such the eNodeB does not have to explicitly authorize the remote UE. In this case, the authentication between the remote UE and the relay UE, as well as a service level authorization for the remote UE, are sufficient.

In one example, the sidelink relay control configuration (SLrelayControlConfiguration) parameter can indicate the relay UE to release or redirect a remote UE. This can be applicable during an out-of-coverage to an in-coverage scenario. Based on this parameter, the eNodeB can provide control to the relay UE to be able to release or direct remote UEs, such that the eNodeB is not involved in the release or direction of the remote UEs. However, in some cases, the eNodeB may want to be involved for tighter control of the operation of remote UE transitions.

As previously described, after the eNodeB communicates the relay initiation and configuration message with the parameters to the relay UE (e.g., as part of an existing RRC message), the relay UE can be configured to act as a relay for the remote UE. In other words, the relay UE can utilize the parameters to act as a relay for the remote UE. The relay initiation and configuration message can be a dedicated message that is communicated explicitly to the relay UE (i.e., not broadcast).

In some cases, a given UE may not wish to be configured as a relay UE. For example, a given UE with a battery level that is below a defined threshold may wish to not act as a relay, even though the UE is authorized to act as a relay at a service level. In this case, the UE may not initiate a relay operation on its own. In other words, the UE may not communicate a sidelink UE information message to the eNodeB indicating an interest in acting as a relay. When the network initiates the UE to act as a relay (i.e., the UE does not express an interest to act as a relay), the UE which cannot comply with the new configuration specified in the RRC connection reconfiguration message may continue using a previous configuration, as per the current specification.

In one configuration, a remote UE can switch from having a connection with an eNodeB to having a connection with a relay UE. For example, the remote UE can initially be connected to an eNodeB over a Uu interface. In other words, the remote UE can be in-coverage of the eNodeB. During this time, the remote UE can monitor a connection link quality (i.e., a link quality of the Uu interface) according to a legacy behavior. If the connection link quality (or serving channel quality) becomes less than a defined threshold, but the remote UE does not detect any neighboring cells for handover, the remote UE can perform a discovery procedure for relay UE selection. In other words, the remote UE can being searching for a relay UE. The discovery procedure can utilize Model A or Model B, as further described in 3GPP LTE Release 12. Once the remote UE discovers a relay UE in proximity to the remote UE, the remote UE can select the relay UE based on the link quality.

In some cases, when the remote UE is in-coverage and directly connected with the eNodeB, the remote UE may wish to be released from the direct connection with the eNodeB (i.e., the Uu connection) upon establishing the communication with the relay UE. After some time, the remote UE may become out-of-coverage of the eNodeB. These cases are further described in FIGS. 13 and 14.

FIG. 13 illustrates exemplary signaling that enables a relay user equipment (UE) 1320 to act as a relay between an eNodeB 1330 and a remote UE 1310. The eNodeB 1330 can broadcast a relay configuration information message to the relay UE 1320. The relay configuration information message can be included in a system information block (SIB) 18, a SIB 19 or another SIB. The relay UE 1320 and the remote UE 1310 can perform a discovery procedure. The relay UE 1320 can initiate the discovery procedure after determining to act as a relay based on the relay configuration information message received from the eNodeB 1330. Afterwards, the remote UE 1310 can communicate a direct communication request to the relay UE 1320, and the relay UE 1320 and the remote UE 1310 can perform a mutual authentication procedure. At this point, the remote UE 1310 and the relay UE 1320 may perform D2D communications with each other.

In one example, the remote UE 1310 can transmit a newly defined message or an existing message (e.g., a sidelink UE information message) to the eNodeB 1330 to inform the eNodeB 1330 that the remote UE 1310 has established a relay-based connection with the relay UE 1320. The remote UE 1310 can transmit the sidelink UE information message since the remote UE 1310 is still in-coverage of the eNodeB 1330. In addition, the sidelink UE information message can indicate the remote UE's desire to be released from direct communications with the eNodeB 1330. Therefore, the connection between the remote UE 1310 and the eNodeB 1320 (i.e., the Uu connection) can be released, and the remote UE 1310 may only be connected with the relay UE 1320. Therefore, in this configuration, the release of the Uu connection can be initiated by the remote UE 1310.

Figure 14:
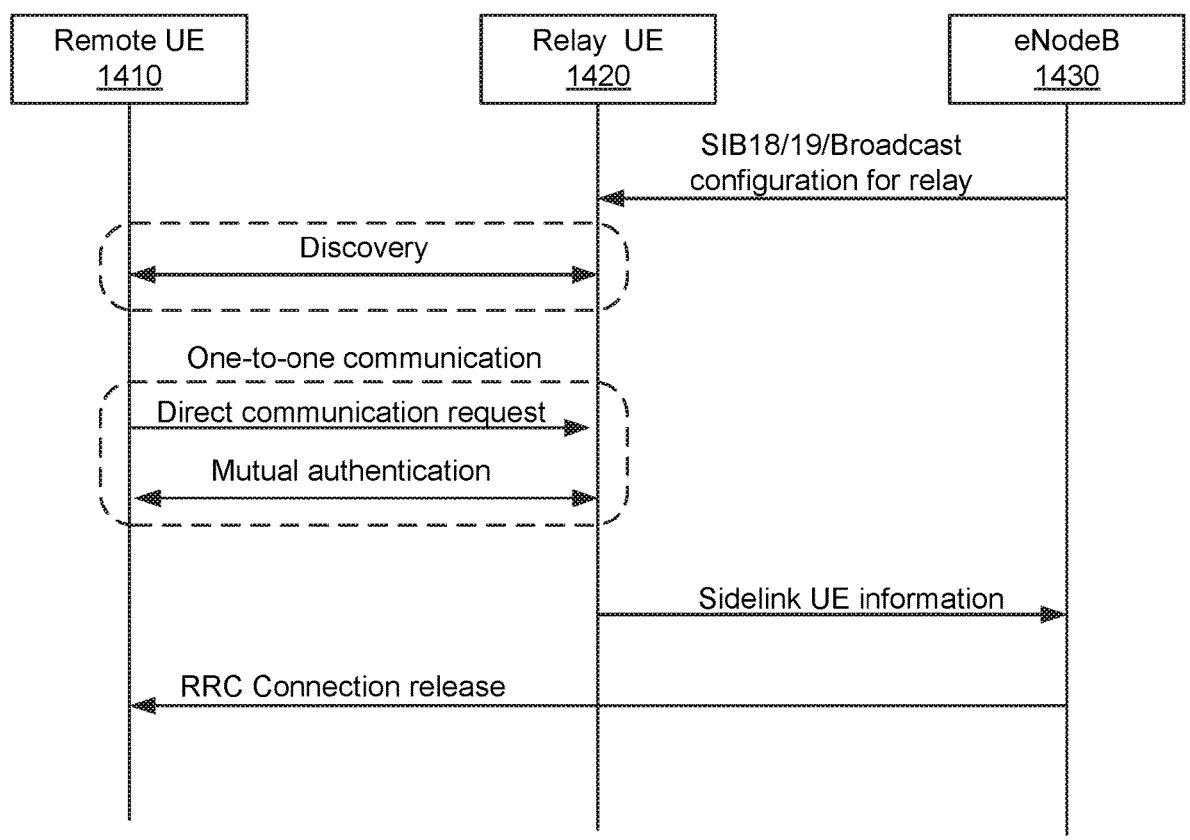
FIG. 14 illustrates signaling that enables a relay user equipment (UE) to act as a relay between an eNodeB and a remote UE in accordance with an example.

FIG. 14 illustrates exemplary signaling that enables a relay user equipment (UE) 1420 to act as a relay between an eNodeB 1430 and a remote UE 1410. The eNodeB 1430 can broadcast a relay configuration information message to the relay UE 1420. The relay configuration information message can be included in a system information block (SIB) 18, a SIB 19 or another SIB. The relay UE 1420 and the remote UE 1410 can perform a discovery procedure. The relay UE 1420 can initiate the discovery procedure after determining to act as a relay based on the relay configuration information message received from the eNodeB 1430. Afterwards, the remote UE 1410 can communicate a direct communication request to the relay UE 1420, and the relay UE 1420 and the remote UE 1410 can perform a mutual authentication procedure. At this point, the remote UE 1410 and the relay UE 1420 may perform D2D communications with each other.

In one example, after establishing a connection with the remote UE 1410, the relay UE 1420 can communicate a newly defined dedicated sidelink message or an existing sidelink UE information message to the eNodeB 1430, wherein this message may include information about the relay UE's connections to remote UEs. In particular, this message can include specific identifiers (IDs) of remote UEs that are connected to the relay UE 1420. Based on this information, the eNodeB 1430 can perform an RRC connection release with the remote UE 1410. In other words, the eNodeB 1430 can release a Uu connection with the remote UE 1410. Therefore, in this configuration, the release of the Uu connection can be initiated by the relay UE 1420 and/or the eNodeB 1430, as opposed to the remote UE 1410.

In one configuration, a remote UE can move from out-of-coverage to in-coverage of an eNodeB. The remote UE can establish a direct connection with the eNodeB using legacy procedures. In other words, after the remote UE is in a suitable cell, the remote UE can perform an RRC connection establishment procedure in order to establish a direct connection with the eNodeB. The remote UE may have been connected to a relay UE when out-of-coverage. In some cases, after establishing the direct connection with the eNodeB, the remote UE may terminate the connection with the relay UE (i.e., stop the UE-to-NW relay functionality). For example, the remote UE may discontinue using the relay UE as a relay after the remote UE detects any cell fulfilling the S criterion, as defined in 3GPP TS 36.304 Section 5.2.3.2. In another example, the remote UE may discontinue using the relay UE as a relay after the remote UE finds a suitable cell or a cell in a limited service. In yet another example, the remote UE may discontinue using the relay UE as a relay after the remote UE successfully establishes an RRC connection, sends an RRC connection request, or establishes an EPS bearer for an application that was previously served by the relay UE.

In one example, the relay UE can redirect the remote UE to establish a direct Uu connection with the eNodeB, as the relay UE has access to both the PC5 interface (i.e., the interface between the relay UE and the remote UE) and Uu link quality measurements (i.e., link quality measurements between the relay UE and the eNodeB). In this case, if the relay UE determines that the PC5 link quality is above a certain upper threshold, then the relay UE can recommend or initiate the remote UE to perform cell detection/measurements for establishing a direct link connection with the eNodeB. Once the remote UE has established communication with the eNodeB, the remote UE can request the relay UE to be released on the relay link for a graceful transition.

In one configuration, the remote UE can initiate relay discovery and selection. In other words, an in-coverage ProSe enabled UE can initiate a relay discovery procedure. In a first scenario, the eNodeB can receive a measurement report (e.g., a report with RSRP and/or RSRQ measurements) from the remote UE, and if the measurement report indicates that a Uu link quality is below a certain threshold, the eNodeB can trigger a discovery procedure in the remote UE. In a second scenario, the remote UE can trigger a relay discovery procedure on its own based on advertised thresholds in dedicated signaling or system information.

In one example, these thresholds can be set to conservative values compared to the S-criteria thresholds defined for the legacy cell selection procedure in LTE, as the remote UE will continue to maintain the Uu connection until a relay communication is determined and established. The remote UE can support simultaneous operation on the PC5 interface with the relay UE and the Uu connection with the eNodeB.

As previously described, the remote UE can trigger the relay discovery procedure on its own based on the advertised thresholds in dedicated signaling or system information. In one example, these thresholds can be communicated to the remote UE via a sidelink discovery configuration information element (IE). The sidelink discovery configuration IE can be communicated from the eNodeB to the remote UE in a SIB 18, a SIB 19, or an RRC connection reconfiguration message. Based on the thresholds included in the sidelink discovery configuration IE, the remote UE can initiate a discovery procedure to identify a relay UE that is located in proximity to the remote UE. In another example, these thresholds can be provided where S-criteria thresholds are provided within the system information message (e.g., SIB3), which is the trigger to an intra/inter cell search.

FIGS. 15 and 16 are exemplary abstract syntax notation (ASN) codes describing a sidelink discovery configuration information element (IE). The sidelink discovery configuration IE (IE SL-DiscConfig) can be communicated from the eNodeB to a remote UE. More specifically, the sidelink discovery configuration IE can be communicated via a SIB 18, a SIB 19, or an RRC connection reconfiguration or sidelink UE information message. The sidelink discovery configuration IE can include various measurement thresholds, which can be used by the remote UE to perform a relay discovery procedure. For example, the remote UE can compare its own measurements (e.g., RSRP or RSRQ measurements) to the measurement threshold, and based on the comparison, the remote UE can perform the relay discovery procedure and further relay communication. In other words, if a link quality between the remote UE and an eNodeB is less than a defined threshold, the remote UE can initiate the relay discovery procedure in order to identify a given UE to act as a relay between the eNodeB and the remote UE. The relaySelectionInfo parameters may also be interpreted as cell selection information broadcast by a serving cell in SIB19 to be used by the remote UE to select a cell on another frequency.

In one example, the configuration information described above can be provided from the eNodeB to the remote UE using another type of dedicated signaling message while the remote UE is still in coverage of the eNodeB.

In one configuration, an out-of-coverage remote UE (or ProSe enabled UE) can initiate relay discovery and selection. In this scenario, the technique used by the out-of-coverage remote UE can be up to UE implementation.

In one configuration, the relay UE may be associated with a particular RRC state during the discovery phase and the one-to-one communication phase. During the discovery phase, the relay UE may not have any on-going data activity in both the PC5 interface and the Uu interface. In the discovery phase, the relay UE is allowed to perform discovery (if the announcement of the discovery message is based on Model A) even when the relay UE is in RRC idle mode. The relay UE can initiate an RRC connection establishment if the eNodeB requires the relay UE to obtain eNodeB authorization for discovery due to relay operations. Similar to the discovery procedure in Release 12, if the eNodeB allocates discovery resource via dedicated signaling, the UE should be in a connected mode in order to receive the discovery resource configuration. If Model B of the discovery procedure is used, the relay UE should monitor only for the discovery message. In this case, the relay UE can be kept in the idle mode. During the one-to-one communication phase, in order to route data to the network, the relay UE should be in connected mode.

In one configuration, a relay reselection signaling optimization can be implemented. In Release 12, the eNodeB, upon receiving a connection establishment request from a ProSe-enabled UE (i.e., a remote UE), has to fetch ProSe UE context from the core network. For example, the eNodeB can fetch the ProSe UE context from the core network via a mobility management entity (MME), a home subscriber server (HSS) and/or a ProSe Function. In Release 13, if the remote UE uses a relay UE for communication and is to be authorized by the eNodeB for every relay reselection within the same eNodeB coverage, this may lead to an increased amount of signaling overhead and latency.

In one example, if the eNodeB authorization is expected for the remote UE which is out-of-coverage, then the relay UE can forward the remote UE ID to the eNodeB. The remote UE ID can be an International Mobile Subscriber Identity (IMSI), a ProSe UE ID, or a link layer ID. After the relay UE forwards the remote UE to the eNodeB, the eNodeB can fetch the ProSe UE context from the core network. Then, the eNodeB can store this ProSe UE context (specifically for remote UEs) for a defined period of time, such that the ProSe UE context can be re-utilized upon relay reselection.

Figure 17:
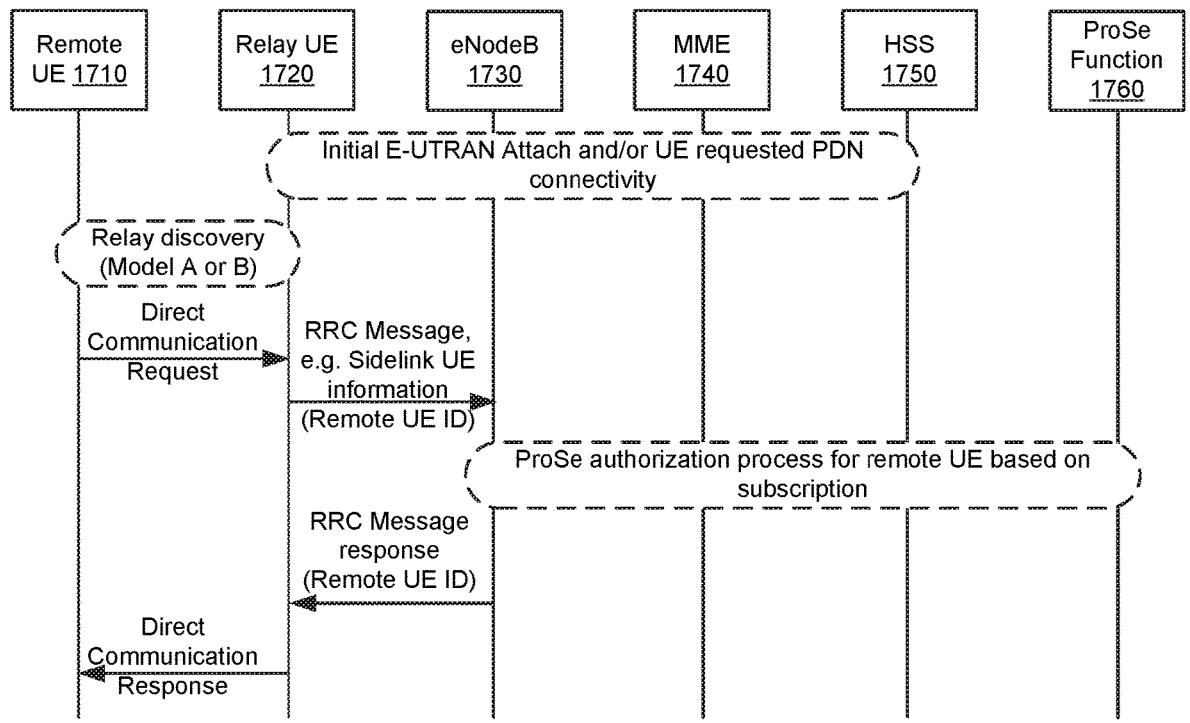
FIG. 17 illustrates relay reselection signaling in accordance with an example.

FIG. 17 illustrates exemplary relay reselection signaling. More specifically, a relay selection procedure can be performed in which the eNodeB 1730 retrieves ProSe UE context from a core network (CN). The ProSe UE context can be associated with a remote UE 1710. The retrieval of the ProSe UE context can involve multiple nodes in the CN, such as a mobility management entity (MME) 1740, a home subscriber server (HSS) 1750, and a ProSe Function 1760.

In one example, an initial E-UTRAN attach and/or UE requested packet data network (PDN) connectivity can be performed. The remote UE 1710 can perform a relay discovery procedure with a relay UE 1720, wherein the relay discovery procedure is in accordance with either Model A or Model B. The remote UE 1710 can communicate a direct communication request message to the relay UE 1720. The relay UE 1720 can communicate an RRC message (e.g., a sidelink UE information message) to the eNodeB 1730, wherein the RRC message includes a remote UE ID. The eNodeB 1730 can perform a ProSe authorization process for the remote UE 1710 based on a subscription. During this process, the eNodeB 1730 can retrieve remote UE context information from the core network (i.e., the MME 1740, the HSS 1750 and the ProSe Function 1760). The eNodeB 1730 can communicate an RRC message response to the relay UE 1720, wherein the RRC message response includes the remote UE ID. In addition, the relay UE 1720 can communicate a direct communication response message to the remote UE 1710.

Figure 18:
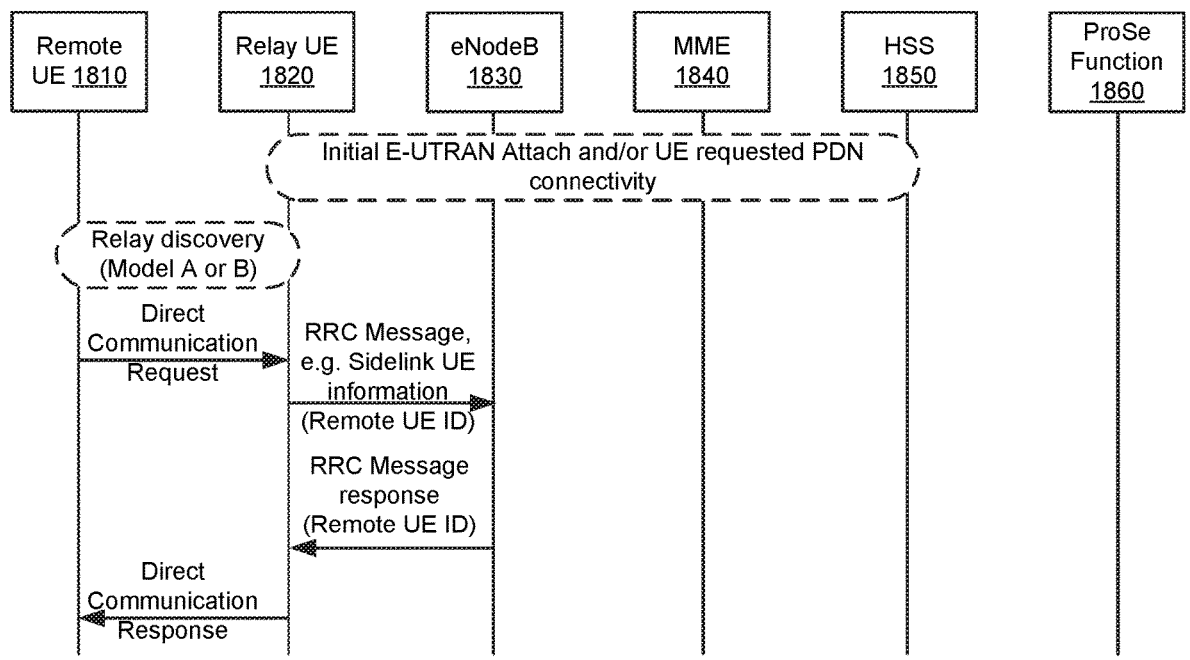
FIG. 18 illustrates relay reselection signaling in accordance with an example.

FIG. 18 illustrates exemplary relay reselection signaling. More specifically, a relay selection procedure can be performed in which the eNodeB 1830 retrieves stored ProSe UE context. The ProSe UE context can be associated with a remote UE 1810. In this configuration, the eNodeB 1830 does not have to retrieve the ProSe UE context from a core network (CN), wherein the CN includes a mobility management entity (MME) 1840, a home subscriber server (HSS) 1850, and a ProSe Function 1860.

In one example, an initial E-UTRAN attach and/or UE requested packet data network (PDN) connectivity can be performed. The remote UE 1810 can perform a relay discovery procedure with a relay UE 1820, wherein the relay discovery procedure is in accordance with either Model A or Model B. The remote UE 1810 can communicate a direct communication request message to the relay UE 1820. The relay UE 1820 can communicate an RRC message (e.g., a sidelink UE information message) to the eNodeB 1830, wherein the RRC message includes a remote UE ID. In this configuration, the eNodeB 1830 does not perform a ProSe authorization process for the remote UE 1810 based on a subscription. Rather, since remote UE context information is already stored at the eNodeB 1830, the eNodeB 1830 can communicate an RRC message response to the relay UE 1820, wherein the RRC message response includes the remote UE ID. In addition, the relay UE 1820 can communicate a direct communication response message to the remote UE 1810.

As previously described, a relay UE can act as a relay between a remote UE and an eNodeB when the remote UE is not connected to the eNodeB. In one configuration, the remote UE can be associated with the following features: (1) The remote UE can be ProSe-enabled and capable of communicating with the eNodeB via a direct communication or via the relay UE (also referred to as a UE-to-Network Relay). (2) The remote UE can directly communicate a sidelink UE information message or a newly defined message to the eNodeB in order to inform the eNodeB that the remote UE has identified a relay UE for communication, and therefore, the remote UE wishes to be released from direct communication with the eNodeB. (3) The remote UE can stop using the relay UE for communication if the remote UE: detects a cell fulfilling the S-criterion, detects a suitable cell, or establishes a connection with the eNodeB. (4) The remote UE can receive a command from the relay UE to switch to a direct connection with the relay UE. (5) The remote UE can trigger a relay discovery procedure based on a command from the eNodeB. (6) The remote UE can trigger the relay discovery procedure by itself using broadcast link quality thresholds and its own measurements. (7) The remote UE can receive the link quality thresholds and relay initiation commands via system information or dedicated signaling.

In one configuration, the relay UE can be associated with the following features: (1) The relay UE can support ProSe D2D communication along with relay operation acting as a UE-to-Network relay to send or receive communication from the eNodeB on one side and other remote UEs from the other side. (2) The relay UE can receive a broadcast of certain relay configuration related parameters. The broadcast can be in existing or new system information. These parameters can include threshold parameters representing a link quality measurement between the relay UE and the remote UE, a mobility state parameter that should be satisfied by the relay UE, and a parameter indicating whether the relay UE supports acting as a relay from idle or connected mode. (3) The relay UE can send a dedicated sidelink UE relay interest indication message to the eNodeB. (4) The relay UE can receive a relay initiation and configuration within a 'sl-RelayConfig-r13' field. The relay initiation and configuration can be included in an RRC connection reconfiguration message, a new unicast or broadcast, or an existing or new system information message received from the eNodeB.

Moreover, (5) The relay UE can process and apply the following configuration parameters: SLrelayDiscoveryStart (to start the discovery procedure for the relay UE), t_relayDiscoveryPeriodicity (to specify the frequency of relay advertisements), t_relayOperationTimer (validity of the relaying operation), SLmaxRemoteUEs (number of UEs that can be connected through the relay UE), SLrelayResourceConfiguration (specific pool configuration information), SLremoteUEAuthorization (whether the remote UE may be authorized by the relay UE itself), and SLrelayControlConfiguration (whether the relay UE may release/redirect the remote UEs by itself). (6) The relay UE can decide to act as a relay based on internal information, such as serving cell measurements (in comparison to provided thresholds), battery status information, and user input information. (7) The relay UE can decide to act as a relay upon reception of the configuration parameters from the eNodeB.

Moreover, (8) The relay UE can process a communication request message from the remote UE, and initiate the relay process if not already configured by the eNodeB using an existing message (e.g., SidelinkUEinformation) or a newly defined message. (9) The relay UE can send remote UE information (e.g. a remote UE ID) in a newly defined message or an existing message once the remote UE connection is established. (10) The relay UE can recommend a remote UE to switch its connection from relaying to direct communication based on PC5 and Uu link quality measurements and thresholds. (11) The relay UE can determine if eNodeB authorization is required and initiate an RRC connection establishment procedure before performing a relay discovery process. (12) The remote UE can receive remote UE information (e.g., eNodeB authorization, context information) in a newly defined message or an existing message in order to complete a remote UE one-to-one connection.

In one configuration, the eNodeB can be associated with the following features: (1) The eNodeB (or a similar network node) can support ProSe D2D groupcast and unicast communication along with relay operation. The eNodeB can configure certain UEs to act as UE-to-Network relays and send or receive communications from such relays. (2) The eNodeB can broadcast certain relay configuration related parameters. The broadcast can be in existing or new system information. These parameters can include threshold parameters that represent link quality measurements between the relay UE and the eNodeB, a mobility state parameter that should be satisfied by the relay UE, and a parameter indicating whether the relay UE supports acting as a relay from idle or connected mode. (3) The eNodeB can receive a sidelink UE information (SidelinkUEInformation) message with a given UE's interest indication to act as a relay. (4) The eNodeB can receive a dedicated sidelink UE relay interest indication (SideLinkUERelayInterestIndication) message from the relay UE. (5) The eNodeB can send a relay initiation and configuration within a 'sl-RelayConfig-r13' field. The relay initiation and configuration can be included in an RRC connection reconfiguration message, a new unicast or broadcast, or an existing or new system information message received from the eNodeB.

Moreover, (6) The configuration parameters can include the following: SLrelayDiscoveryStart (to start the discovery procedure for the relay UE), t_relayDiscoveryPeriodicity (to specify the frequency of relay advertisements), t_relayOperationTimer (validity of the relaying operation), SLmaxRemoteUEs (number of UEs that can be connected through the relay UE), SLrelayResourceConfiguration (specific pool configuration information), SLremoteUEAuthorization (whether the remote UE may be authorized by the relay UE itself), and SLrelayControlConfiguration (whether the relay UE may release/redirect the remote UEs by itself).

Moreover, (7) The eNodeB can receive remote UE information (e.g., a remote UE ID) through the relay UE in a newly defined message or an existing message once the remote UE connection is established through the relay UE, thereby releasing the remote UE's direct connection. (8) The eNodeB can send a message to the remote UE to initiate its relay discovery procedure based on the remote UE's measurement report. (9) The eNodeB can send configuration information related to thresholds of link quality measurements within a discovery configuration container or a new container in a dedicated signaling message to the remote UE. (10) The eNodeB can send configuration information to control the initiation of the relay discovery procedure of the remote UE. (11) The eNodeB can store remote UE context upon fetching the remote UE context from the core network for relay reselection purposes.

Figure 19:
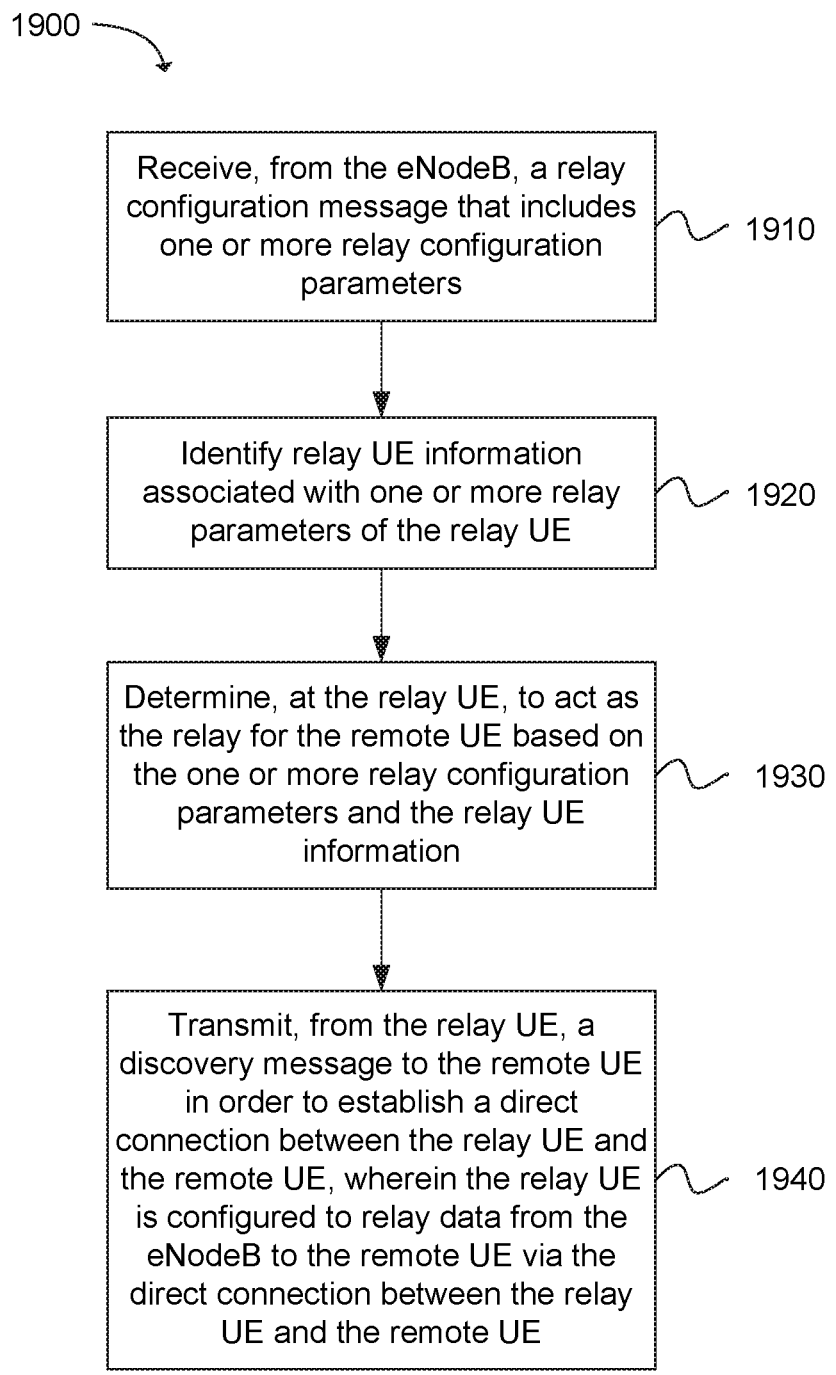
FIG. 19 depicts functionality of a relay user equipment (UE) operable to act as a relay between a remote UE and an eNodeB in accordance with an example.

Another example provides functionality 1900 of a relay user equipment (UE) operable to act as a relay between a remote UE and an eNodeB, as shown in the flow chart in FIG. 19. The functionality can be implemented as a method or the functionality can be executed as instructions on a machine, where the instructions are included on at least one computer readable medium or one non-transitory machine readable storage medium. The relay UE can comprise one or more processors and memory configured to: receive, from the eNodeB, a relay configuration message that includes one or more relay configuration parameters, as in block 1910. The relay UE can comprise one or more processors and memory configured to: identify relay UE information associated with one or more relay parameters of the relay UE, as in block 1920. The relay UE can comprise one or more processors and memory configured to: determine, at the relay UE, to act as the relay for the remote UE based on the one or more relay configuration parameters and the relay UE information, as in block 1930. The relay UE can comprise one or more processors and memory configured to: transmit, from the relay UE, a discovery message to the remote UE in order to establish a direct connection between the relay UE and the remote UE, wherein the relay UE is configured to relay data from the eNodeB to the remote UE via the direct connection between the relay UE and the remote UE, as in block 1940.

Figure 20:
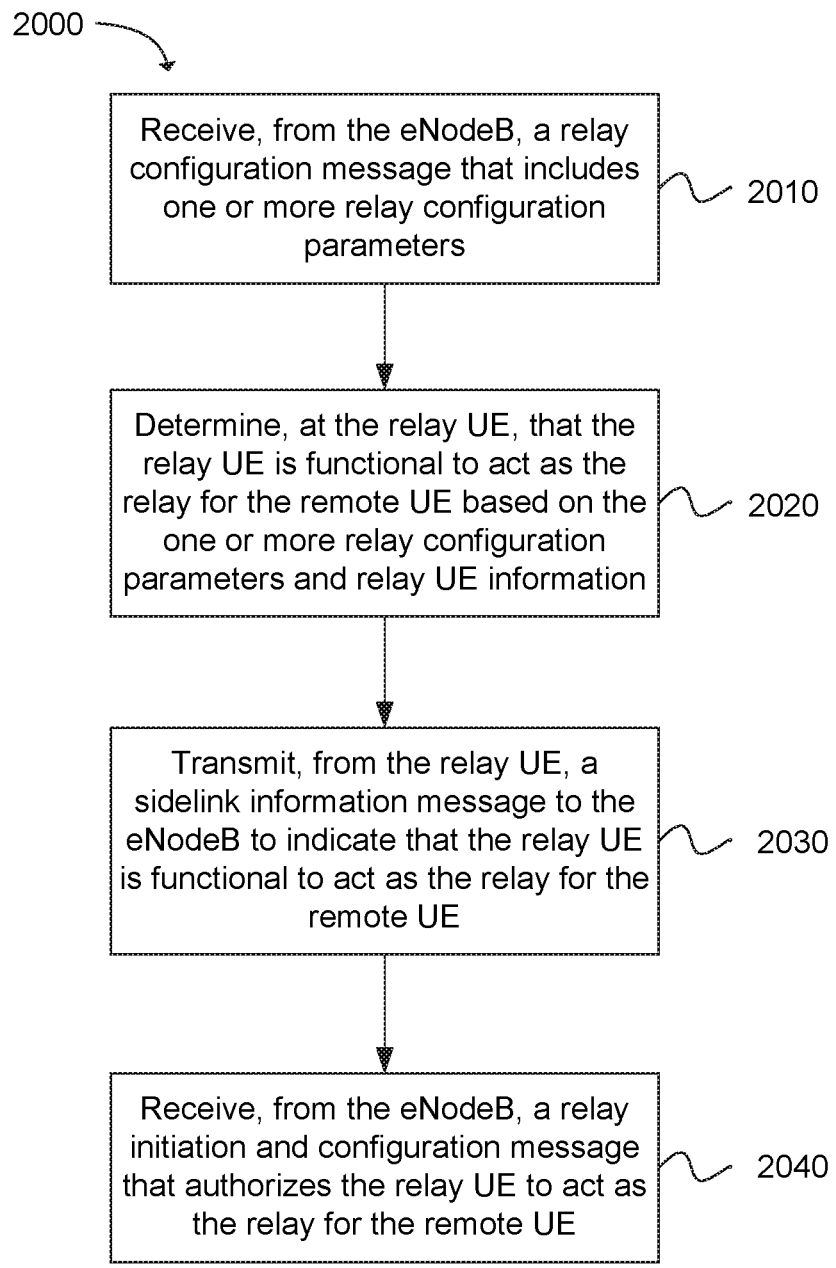
FIG. 20 depicts functionality of a relay user equipment (UE) operable to act as a relay between a remote UE and an eNodeB in accordance with an example.

Another example provides functionality 2000 of a relay user equipment (UE) operable to act as a relay between a remote UE and an eNodeB, as shown in the flow chart in FIG. 20. The functionality can be implemented as a method or the functionality can be executed as instructions on a machine, where the instructions are included on at least one computer readable medium or one non-transitory machine readable storage medium. The relay UE can comprise one or more processors and memory configured to: receive, from the eNodeB, a relay configuration message that includes one or more relay configuration parameters, as in block 2010. The relay UE can comprise one or more processors and memory configured to: determine, at the relay UE, that the relay UE is functional to act as the relay for the remote UE based on the one or more relay configuration parameters and relay UE information, as in block 2020. The relay UE can comprise one or more processors and memory configured to: transmit, from the relay UE, a sidelink information message to the eNodeB to indicate that the relay UE is functional to act as the relay for the remote UE, as in block 2030. The relay UE can comprise one or more processors and memory configured to: receive, from the eNodeB, a relay initiation and configuration message that authorizes the relay UE to act as the relay for the remote UE, as in block 2040.

Figure 21:
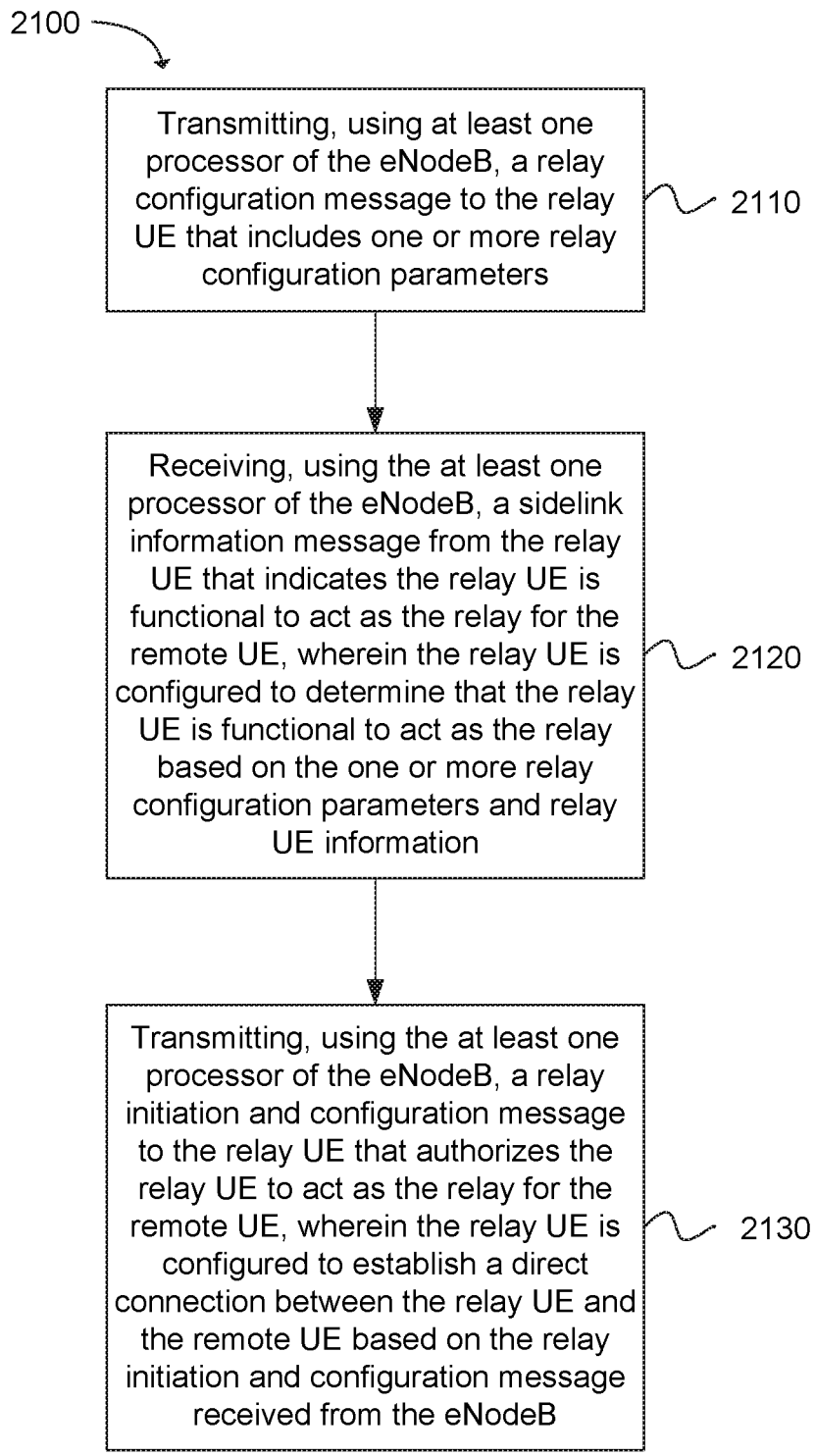
FIG. 21 depicts functionality of an eNodeB operable to instruct a relay user equipment (UE) to act as a relay between the eNodeB and a remote UE in accordance with an example.

Another example provides at least one machine readable storage medium having instructions 2100 embodied thereon for instructing a relay user equipment (UE) to act as a relay between an eNodeB and a remote UE, as shown in the flow chart in FIG. 21. The method can be executed as instructions on a machine, where the instructions are included on at least one computer readable medium or one non-transitory machine readable storage medium. The instructions when executed perform the following: transmitting, using at least one processor of the eNodeB, a relay configuration message to the relay UE that includes one or more relay configuration parameters, as in block 2110. The instructions when executed perform the following: receiving, using the at least one processor of the eNodeB, a sidelink information message from the relay UE that indicates the relay UE is functional to act as the relay for the remote UE, wherein the relay UE is configured to determine that the relay UE is functional to act as the relay based on the one or more relay configuration parameters and relay UE information, as in block 2120. The instructions when executed perform the following: transmitting, using the at least one processor of the eNodeB, a relay initiation and configuration message to the relay UE that authorizes the relay UE to act as the relay for the remote UE, wherein the relay UE is configured to establish a direct connection between the relay UE and the remote UE based on the relay initiation and configuration message received from the eNodeB, as in block 2130.

Figure 22:
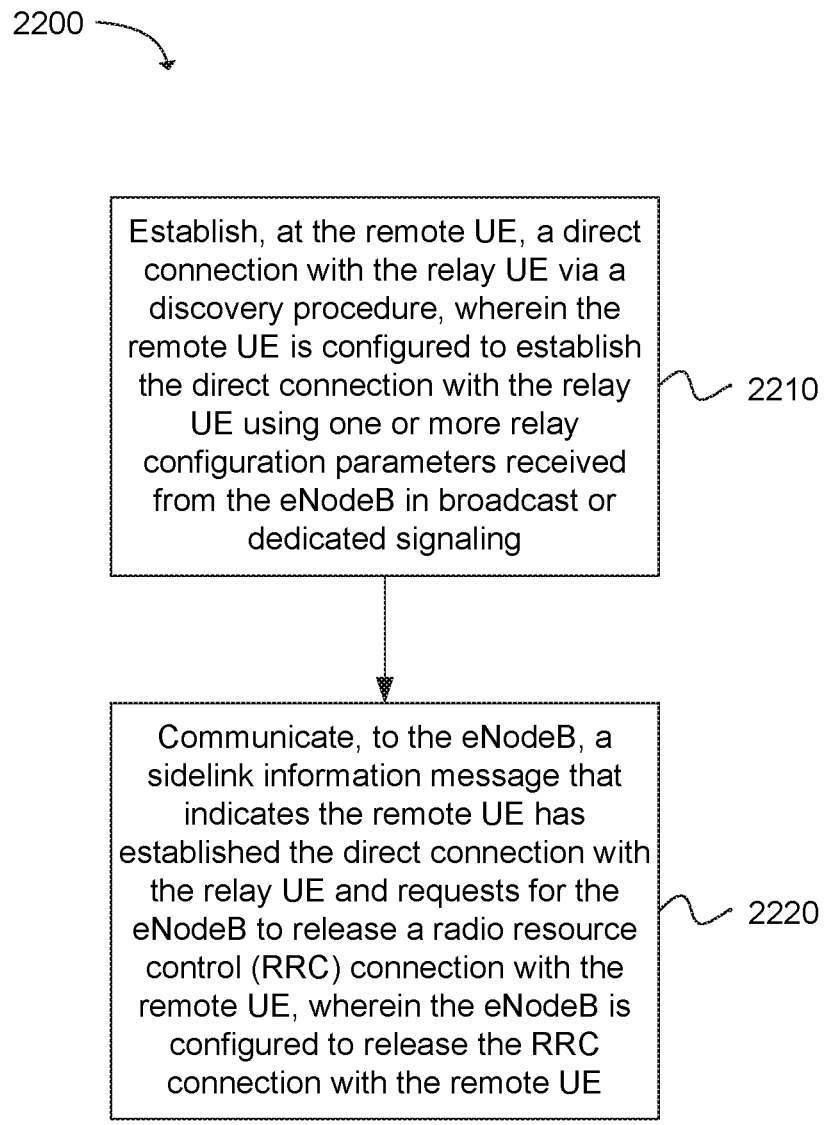
FIG. 22 depicts functionality of a remote user equipment (UE) operable to communicate with an eNodeB via a relay UE in accordance with an example.

Another example provides functionality 2200 of a remote user equipment (UE) operable to communicate with an eNodeB via a relay UE, as shown in the flow chart in FIG. 22. The functionality can be implemented as a method or the functionality can be executed as instructions on a machine, where the instructions are included on at least one computer readable medium or one non-transitory machine readable storage medium. The remote UE can comprise one or more processors and memory configured to: establish, at the remote UE, a direct connection with the relay UE via a discovery procedure, wherein the remote UE is configured to establish the direct connection with the relay UE using one or more relay configuration parameters received from the eNodeB in broadcast or dedicated signaling, as in block 2210. The remote UE can comprise one or more processors and memory configured to: communicate, to the eNodeB, a sidelink information message that indicates the remote UE has established the direct connection with the relay UE and requests for the eNodeB to release a radio resource control (RRC) connection with the remote UE, wherein the eNodeB is configured to release the RRC connection with the remote UE, as in block 2220.

Figure 23:
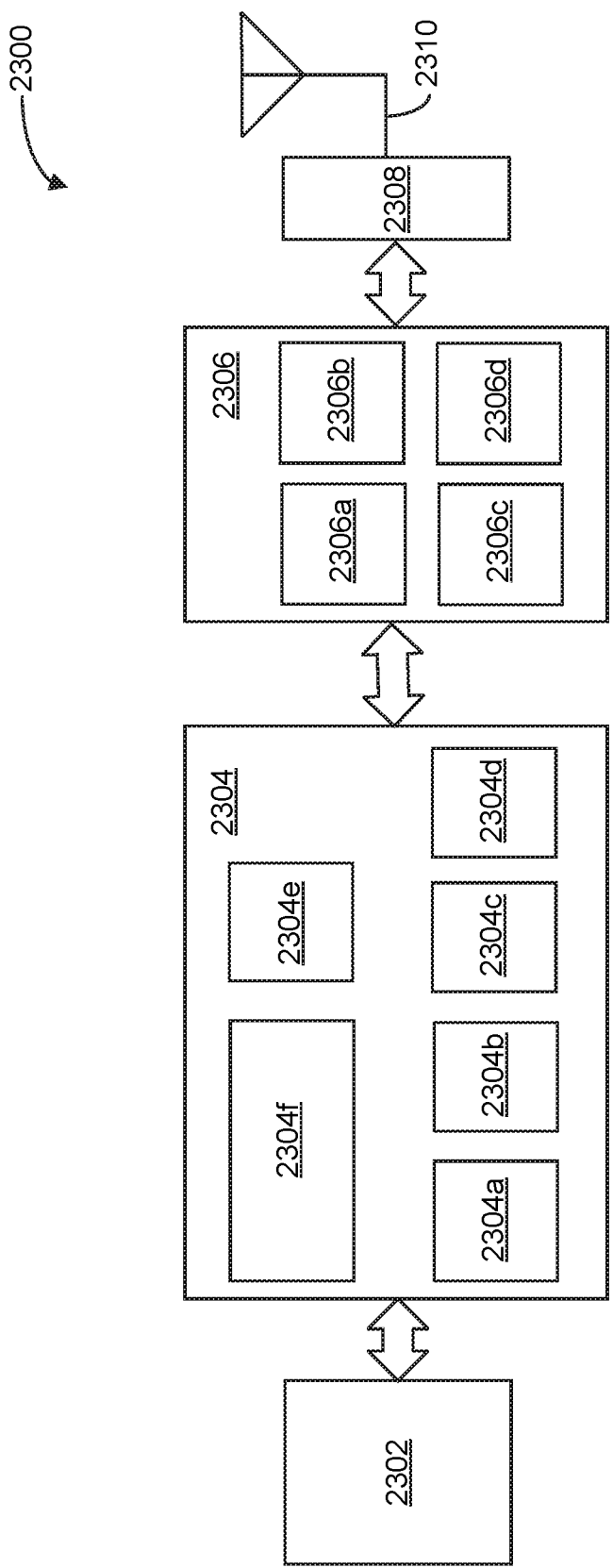
FIG. 23 illustrates a diagram of a wireless device (e.g., UE) in accordance with an example.

FIG. 23 provides an example illustration of a user equipment (UE) device 2300, such as a wireless device, a mobile station (MS), a mobile wireless device, a mobile communication device, a tablet, a handset, or other type of wireless device. The UE device 2300 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 2300 can be configured to communicate using at least one wireless communication standard including 3GPP LTE, WiMAX, High Speed Packet Access (HSPA), Bluetooth, and WiFi. The UE device 2300 can communicate using separate antennas for each wireless communication standard or shared antennas for multiple wireless communication standards. The UE device 2300 can communicate in a wireless local area network (WLAN), a wireless personal area network (WPAN), and/or a WWAN.

In some embodiments, the UE device 2300 may include application circuitry 2302, baseband circuitry 2304, Radio Frequency (RF) circuitry 2306, front-end module (FEM) circuitry 2308 and one or more antennas 2310, coupled together at least as shown.

The application circuitry 2302 may include one or more application processors. For example, the application circuitry 2302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 2304 may include circuitry such as, but not limited to, one or more single-core or multi-core processors. The baseband circuitry 2304 may include one or more baseband processors and/or control logic to process baseband signals received from a receive signal path of the RF circuitry 2306 and to generate baseband signals for a transmit signal path of the RF circuitry 2306. Baseband processing circuity 2304 may interface with the application circuitry 2302 for generation and processing of the baseband signals and for controlling operations of the RF circuitry 2306. For example, in some embodiments, the baseband circuitry 2304 may include a second generation (2G) baseband processor 2304*a*, third generation (3G) baseband processor 2304*b*, fourth generation (4G) baseband processor 2304*c*, and/or other baseband processor(s) 2304*d* for other existing generations, generations in development or to be developed in the future (e.g., fifth generation (5G), 6G etc.). The baseband circuitry 2304 (e.g., one or more of baseband processors 2304*a-d*) may handle various radio control functions that enable communication with one or more radio networks via the RF circuitry 2306. The radio control functions may include, but are not limited to, signal modulation/demodulation, encoding/decoding, radio frequency shifting, etc. In some embodiments, modulation/demodulation circuitry of the baseband circuitry 2304 may include Fast-Fourier Transform (FFT), precoding, and/or constellation mapping/demapping functionality. In some embodiments, encoding/decoding circuitry of the baseband circuitry 2304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 2304*e* of the baseband circuitry 2304 may be configured to run elements of the protocol stack for signaling of the PHY, MAC, RLC, PDCP and/or RRC layers. In some embodiments, the baseband circuitry may include one or more audio digital signal processor(s) (DSP) 2304*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2304 and the application circuitry 2302 may be implemented together such as, for example, on a system on a chip (SOC).

In some embodiments, the baseband circuitry 2304 may provide for communication compatible with one or more radio technologies. For example, in some embodiments, the baseband circuitry 2304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 2304 is configured to support radio communications of more than one wireless protocol may be referred to as multi-mode baseband circuitry.

The RF circuitry 2306 may enable communication with wireless networks using modulated electromagnetic radiation through a non-solid medium. In various embodiments, the RF circuitry 2306 may include switches, filters, amplifiers, etc. to facilitate the communication with the wireless network. RF circuitry 2306 may include a receive signal path which may include circuitry to down-convert RF signals received from the FEM circuitry 2308 and provide baseband signals to the baseband circuitry 2304. RF circuitry 2306 may also include a transmit signal path which may include circuitry to up-convert baseband signals provided by the baseband circuitry 2304 and provide RF output signals to the FEM circuitry 2308 for transmission.

In some embodiments, the RF circuitry 2306 may include a receive signal path and a transmit signal path. The receive signal path of the RF circuitry 2306 may include mixer circuitry 2306a, amplifier circuitry 2306b and filter circuitry 2306c. The transmit signal path of the RF circuitry 2306 may include filter circuitry 2306c and mixer circuitry 2306a. RF circuitry 2306 may also include synthesizer circuitry 2306d for synthesizing a frequency for use by the mixer circuitry 2306a of the receive signal path and the transmit signal path. In some embodiments, the mixer circuitry 2306a of the receive signal path may be configured to down-convert RF signals received from the FEM circuitry 2308 based on the synthesized frequency provided by synthesizer circuitry 2306d. The amplifier circuitry 2306b may be configured to amplify the down-converted signals and the filter circuitry 2306c may be a low-pass filter (LPF) or band-pass filter (BPF) configured to remove unwanted signals from the down-converted signals to generate output baseband signals. Output baseband signals may be provided to the baseband circuitry 2304 for further processing. In some embodiments, the output baseband signals may be zero-frequency baseband signals, although this is not a requirement. In some embodiments, mixer circuitry 2306a of the receive signal path may comprise passive mixers, although the scope of the embodiments is not limited in this respect.

In some embodiments, the mixer circuitry 2306a of the transmit signal path may be configured to up-convert input baseband signals based on the synthesized frequency provided by the synthesizer circuitry 2306d to generate RF output signals for the FEM circuitry 2308. The baseband signals may be provided by the baseband circuitry 2304 and may be filtered by filter circuitry 2306c. The filter circuitry 2306c may include a low-pass filter (LPF), although the scope of the embodiments is not limited in this respect.

In some embodiments, the mixer circuitry 2306a of the receive signal path and the mixer circuitry 2306a of the transmit signal path may include two or more mixers and may be arranged for quadrature down-conversion and/or up-conversion respectively. In some embodiments, the mixer circuitry 2306a of the receive signal path and the mixer circuitry 2306a of the transmit signal path may include two or more mixers and may be arranged for image rejection (e.g., Hartley image rejection). In some embodiments, the mixer circuitry 2306a of the receive signal path and the mixer circuitry 2306a may be arranged for direct down-conversion and/or direct up-conversion, respectively. In some embodiments, the mixer circuitry 2306a of the receive signal path and the mixer circuitry 2306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2306 may include analog-to-digital converter (ADC) and digital-to-analog converter (DAC) circuitry and the baseband circuitry 2304 may include a digital baseband interface to communicate with the RF circuitry 2306.

In some dual-mode embodiments, a separate radio IC circuitry may be provided for processing signals for each spectrum, although the scope of the embodiments is not limited in this respect.

In some embodiments, the synthesizer circuitry 2306d may be a fractional-N synthesizer or a fractional N/N+1 synthesizer, although the scope of the embodiments is not limited in this respect as other types of frequency synthesizers may be suitable. For example, synthesizer circuitry 2306d may be a delta-sigma synthesizer, a frequency multiplier, or a synthesizer comprising a phase-locked loop with a frequency divider.

The synthesizer circuitry 2306d may be configured to synthesize an output frequency for use by the mixer circuitry 2306a of the RF circuitry 2306 based on a frequency input and a divider control input. In some embodiments, the synthesizer circuitry 2306d may be a fractional N/N+1 synthesizer.

In some embodiments, frequency input may be provided by a voltage controlled oscillator (VCO), although that is not a requirement. Divider control input may be provided by either the baseband circuitry 2304 or the applications processor 2302 depending on the desired output frequency. In some embodiments, a divider control input (e.g., N) may be determined from a look-up table based on a channel indicated by the applications processor 2302.

Synthesizer circuitry 2306d of the RF circuitry 2306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2306 may include an IQ/polar converter.

FEM circuitry 2308 may include a receive signal path which may include circuitry configured to operate on RF signals received from one or more antennas 2310, amplify the received signals and provide the amplified versions of the received signals to the RF circuitry 2306 for further processing. FEM circuitry 2308 may also include a transmit signal path which may include circuitry configured to amplify signals for transmission provided by the RF circuitry 2306 for transmission by one or more of the one or more antennas 2310.

In some embodiments, the FEM circuitry 2308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 2306). The transmit signal path of the FEM circuitry 2308 may include a power amplifier (PA) to amplify input RF signals (e.g., provided by RF circuitry 2306), and one or more filters to generate RF signals for subsequent transmission (e.g., by one or more of the one or more antennas 2310.

Figure 24:
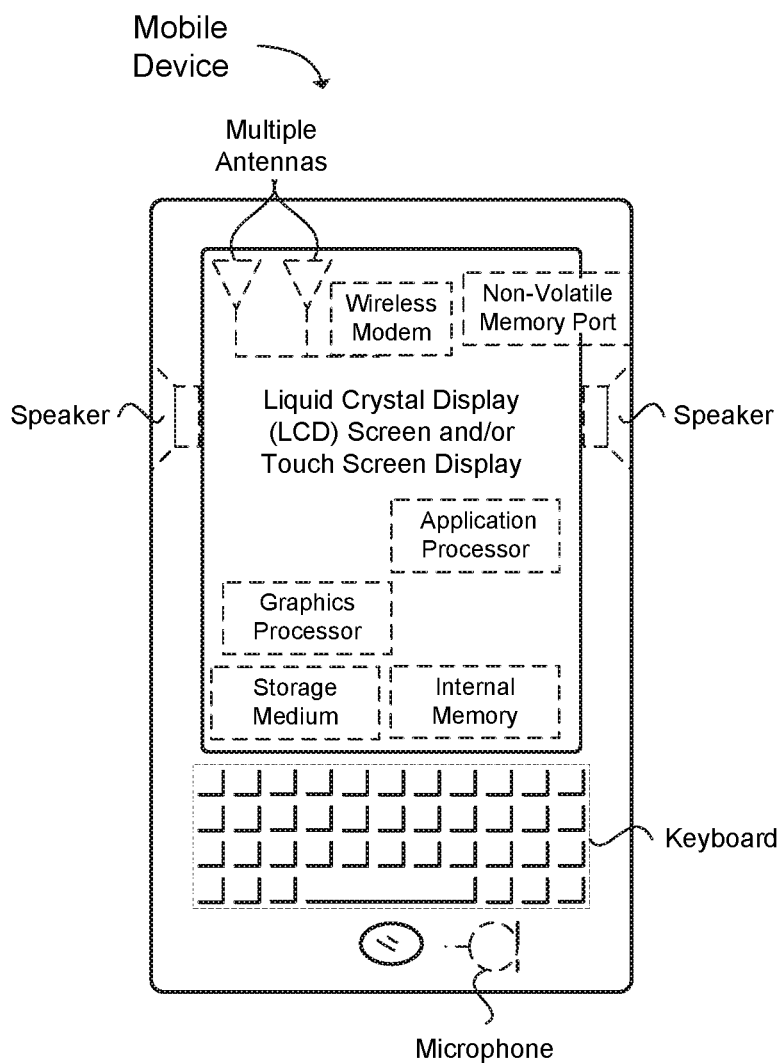
FIG. 24 illustrates a diagram of a wireless device (e.g., UE) in accordance with an example.

FIG. 24 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 24 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a relay user equipment (UE) operable to act as a relay between a remote UE and an eNodeB, the apparatus comprising one or more processors and memory configured to: receive, from the eNodeB, a relay configuration message that includes one or more relay configuration parameters; identify relay UE information associated with one or more relay parameters of the relay UE; determine, at the relay UE, to act as the relay for the remote UE based on the one or more relay configuration parameters and the relay UE information; and transmit, from the relay UE, a discovery message to the remote UE in order to establish a direct connection between the relay UE and the remote UE, wherein the relay UE is configured to relay data from the eNodeB to the remote UE via the direct connection between the relay UE and the remote UE.

Example 2 includes the apparatus of Example 1, further configured to transmit a sidelink information message to the eNodeB to indicate that the relay UE is acting as the relay for the remote UE.

Example 3 includes the apparatus of any of Examples 1-2, wherein the relay UE is in coverage of the eNodeB and the remote UE is out-of-coverage with the eNodeB.

Example 4 includes the apparatus of any of Examples 1-3, wherein the relay UE is configured to receive the relay configuration message in a defined system information block (SIB) via a broadcast from the eNodeB.

Example 5 includes the apparatus of any of Examples 1-4, wherein the relay configuration parameters include one or more of: a first quality threshold parameter that represents a minimum link quality for the relay UE to act as the relay; a second quality threshold parameter that represents a maximum link quality after which the relay UE cannot act as the relay; a relay mobility configuration parameter that indicates an acceptable mobility state for the relay UE; an idle parameter that indicates whether the relay UE is permitted to perform discovery and initiate a relay operation from idle mode; and a relay operation supported parameter that represents whether a cell associated with the eNodeB permits relay operation.

Example 6 includes the apparatus of any of Examples 1-5, wherein the relay UE information includes one or more of: a serving cell measurement, battery status information and user settings.

Example 7 includes the apparatus of any of Examples 1-6, wherein the relay UE is configured to determine to act as the relay based on a comparison between serving cell measurements included in the relay UE information and quality threshold parameters included in the one or more configuration parameters.

Example 8 includes the apparatus of any of Examples 1-7, wherein the relay UE includes at least one of an antenna, a touch sensitive display screen, a speaker, a microphone, a graphics processor, an application processor, a baseband processor, an internal memory, a non-volatile memory port, and combinations thereof.

Example 9 includes an apparatus of a relay user equipment (UE) operable to act as a relay between a remote UE and an eNodeB, the apparatus comprising one or more processors and memory configured to: receive, from the eNodeB, a relay configuration message that includes one or more relay configuration parameters; determine, at the relay UE, that the relay UE is functional to act as the relay for the remote UE based on the one or more relay configuration parameters and relay UE information; transmit, from the relay UE, a sidelink information message to the eNodeB to indicate that the relay UE is functional to act as the relay for the remote UE; and receive, from the eNodeB in broadcast or dedicated signaling, a relay initiation and configuration parameter set that authorizes the relay UE to act as the relay for the remote UE.

Example 10 includes the apparatus of Example 9, further configured to transmit, from the relay UE, a discovery message to the remote UE in order to establish a direct connection between the relay UE and the remote UE, wherein the relay UE is configured to relay data from the eNodeB to the remote UE via the direct connection between the relay UE and the remote UE.

Example 11 includes the apparatus of any of Examples 9-10, wherein the relay UE is configured to: receive the relay configuration message in a defined system information block (SIB) via a broadcast from the eNodeB; and receive the relay initiation and configuration message via dedicated signaling from the eNodeB.

Example 12 includes the apparatus of any of Examples 9-11, wherein the relay initiation and configuration message includes one or more relay configuration parameters that are specific to the relay UE.

Example 13 includes the apparatus of any of Examples 9-12, wherein the relay UE is in coverage of the eNodeB and the remote UE is out-of-coverage with the eNodeB.

Example 14 includes the apparatus of any of Examples 9-13, wherein the relay UE information includes one or more of: a serving cell measurement, battery status information and user settings.

Example 15 includes the apparatus of any of Examples 9-14, wherein the relay UE is configured to determine that the relay UE is functional to act as the relay based on a comparison between serving cell measurements included in the relay UE information and quality threshold parameters included in the one or more configuration parameters sent in broadcast signaling from the eNB.

Example 16 includes at least one machine readable storage medium having instructions embodied thereon for instructing a relay user equipment (UE) to act as a relay between an eNodeB and a remote UE, the instructions when executed perform the following: transmitting, using at least one processor of the eNodeB, a relay configuration message to the relay UE that includes one or more relay configuration parameters; receiving, using the at least one processor of the eNodeB, a sidelink information message from the relay UE that indicates the relay UE is functional to act as the relay for the remote UE, wherein the relay UE is configured to determine that the relay UE is functional to act as the relay based on the one or more relay configuration parameters and relay UE information; and transmitting, using the at least one processor of the eNodeB, a relay initiation and configuration message to the relay UE that authorizes the relay UE to act as the relay for the remote UE, wherein the relay UE is configured to establish a direct connection between the relay UE and the remote UE based on the relay initiation and configuration message received from the eNodeB.

Example 17 includes the at least one machine readable storage medium of Example 16, further comprising instructions which when executed by the at least one processor of the eNodeB performs the following: transmitting data to the remote UE via the relay UE, wherein the relay UE is configured to receive the data from the eNodeB and relay the data to the remote UE via the direct connection between the relay UE and the remote UE.

Example 18 includes the at least one machine readable storage medium of any of Examples 16-17, wherein the relay UE is in coverage of the eNodeB and the remote UE is out-of-coverage with the eNodeB or in coverage of the eNodeB.

Example 19 includes the at least one machine readable storage medium of any of Examples 16-18, wherein eNodeB transmits the relay configuration parameters to the relay UE via a broadcast message and the eNodeB transmits the relay initiation and configuration message to the relay UE via dedicated signaling.

Example 20 includes the at least one machine readable storage medium of any of Examples 16-19, further comprising instructions which when executed by the at least one processor of the eNodeB performs the following: transmitting the relay initiation and configuration message to the relay UE to authorize the relay UE to act as the relay after receiving a measurement report from the remote UE when the remote UE is in coverage of the eNodeB, wherein the measurement report indicates that a connection between the remote UE and the eNodeB is below a defined threshold Example 21 includes the at least one machine readable storage medium of any of Examples 16-20, further comprising instructions which when executed by the at least one processor of the eNodeB performs the following: receiving a message from the relay UE indicating that the direct connection between the relay UE and the remote UE is successfully established, wherein the remote UE is in coverage of the eNodeB; and releasing a radio resource control (RRC) connection with the remote UE.

Example 22 includes an apparatus of a remote user equipment (UE) operable to communicate with an eNodeB via a relay UE, the apparatus comprising one or more processors and memory configured to: establish, at the remote UE, a direct connection with the relay UE via a discovery procedure, wherein the remote UE is configured to establish the direct connection with the relay UE using one or more relay configuration parameters received from the eNodeB in broadcast or dedicated signaling; and communicate, to the eNodeB, a sidelink information message that indicates the remote UE has established the direct connection with the relay UE and requests for the eNodeB to release a radio resource control (RRC) connection with the remote UE, wherein the eNodeB is configured to release the RRC connection with the remote UE.

Example 23 includes the apparatus of Example 22, further configured to perform data communications with the eNodeB via the relay UE, wherein the relay UE is configured to receive data from the eNodeB or the remote UE and relay the data to the remote UE or the eNodeB, respectively, via the direct connection between the relay UE and the remote UE.

Example 24 includes the apparatus of any of Examples 22-23, further configured to drop the direct connection with the relay UE after the relay UE becomes in coverage with a second eNodeB and establishes a connection with the second eNodeB.

Example 25 includes the apparatus of any of Examples 22-24, further configured to establish the direct connection with the relay UE based on an instruction from the eNodeB, wherein the eNodeB sends the instruction after receiving a measurement report from the remote UE that indicates a quality of the RRC connection between the remote UE and the eNodeB is below a defined threshold.

Example 26 includes the apparatus of any of Examples 22-25, further configured to trigger the discovery procedure for establishing the direct connection with the relay UE when a quality of the Uu connection between the remote UE and the eNodeB is below a defined threshold.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a relay user equipment (UE) operable to act as a relay between a remote UE and an eNodeB, the apparatus comprising one or more processors and memory configured to:

receive, from the eNodeB, a relay configuration message that includes relay configuration parameters, wherein the relay configuration parameters include a first quality threshold parameter that represents a minimum link quality for the relay UE to act as the relay and a second quality threshold parameter that represents a maximum link quality after which the relay UE cannot act as the relay;

identify relay UE information associated with one or more relay parameters of the relay UE;

determine, at the relay UE, to act as the relay for the remote UE based on the relay configuration parameters and the relay UE information, wherein the relay UE is configured to determine to act as the relay based on a comparison between serving cell measurements and the first and second quality threshold parameters;

transmit, from the relay UE, a sidelink information message to the eNodeB to indicate that the relay UE is acting as the relay for the remote UE; and transmit, from the relay UE, a discovery message to the remote UE in order to establish a direct connection between the relay UE and the remote UE, wherein the relay UE is configured to relay data from the eNodeB to the remote UE via the direct connection between the relay UE and the remote UE.

2. The apparatus of claim 1, wherein the relay UE is in coverage of the eNodeB and the remote UE is out-of-coverage with the eNodeB.

3. The apparatus of claim 1, wherein the relay UE is configured to receive the relay configuration message in a defined system information block (SIB) via a broadcast from the eNodeB.

4. The apparatus of claim 1, wherein the relay configuration parameters further include one or more of:
a relay mobility configuration parameter that indicates an acceptable mobility state for the relay UE;
an idle parameter that indicates whether the relay UE is permitted to perform discovery and initiate a relay operation from idle mode; and
a relay operation supported parameter that represents whether a cell associated with the eNodeB permits relay operation.

5. The apparatus of claim 1, wherein the relay UE information includes one or more of: a serving cell measurement, battery status information and user settings.

6. The apparatus of claim 1, wherein the relay UE includes at least one of an antenna, a touch sensitive display screen, a speaker, a microphone, a graphics processor, an application processor, a baseband processor, an internal memory, a non-volatile memory port, and combinations thereof.

7. An apparatus of a relay user equipment (UE) operable to act as a relay between a remote UE and an eNodeB, the apparatus comprising one or more processors and memory configured to:
receive, from the eNodeB, a relay configuration message that includes relay configuration parameters, wherein the relay configuration parameters include a first quality threshold parameter that represents a minimum link quality for the relay UE to act as the relay and a second quality threshold parameter that represents a maximum link quality after which the relay UE cannot act as the relay;
determine, at the relay UE, that the relay UE is functional to act as the relay for the remote UE based on the relay configuration parameters and relay UE information;
transmit, from the relay UE, a sidelink information message to the eNodeB to indicate that the relay UE is functional to act as the relay for the remote UE; and
receive, from the eNodeB in broadcast or dedicated signaling, a relay initiation and configuration parameter set that authorizes the relay UE to act as the relay for the remote UE.

8. The apparatus of claim 7, further configured to transmit, from the relay UE, a discovery message to the remote UE in order to establish a direct connection between the relay UE and the remote UE, wherein the relay UE is configured to relay data from the eNodeB to the remote UE via the direct connection between the relay UE and the remote UE.

9. The apparatus of claim 7, wherein the relay UE is configured to:
receive the relay configuration message in a defined system information block (SIB) via a broadcast from the eNodeB; and
receive the relay initiation and configuration message via dedicated signaling from the eNodeB.

10. The apparatus of claim 7, wherein the relay initiation and configuration message includes one or more relay configuration parameters that are specific to the relay UE.

11. The apparatus of claim 7, wherein the relay UE is in coverage of the eNodeB and the remote UE is out-of-coverage with the eNodeB.

12. The apparatus of claim 7, wherein the relay UE information includes one or more of: a serving cell measurement, battery status information and user settings.

13. The apparatus of claim 7, wherein the relay UE is configured to determine that the relay UE is functional to act as the relay based on a comparison between serving cell measurements included in the relay UE information and the first and second quality threshold parameters included in the configuration parameters sent in broadcast signaling from the eNB.

14. At least one non-transitory machine readable storage medium having instructions embodied thereon for instructing a relay user equipment (UE) to act as a relay between an eNodeB and a remote UE, the instructions when executed perform the following:
transmitting, using at least one processor of the eNodeB, a relay configuration message to the relay UE that includes relay configuration parameters, wherein the relay configuration parameters include a first quality threshold parameter that represents a minimum link quality for the relay UE to act as the relay and a second quality threshold parameter that represents a maximum link quality after which the relay UE cannot act as the relay;
receiving, using the at least one processor of the eNodeB, a sidelink information message from the relay UE that indicates the relay UE is functional to act as the relay for the remote UE, wherein the relay UE is configured to determine that the relay UE is functional to act as the relay based on the relay configuration parameters and relay UE information; and
transmitting, using the at least one processor of the eNodeB, a relay initiation and configuration message to the relay UE that authorizes the relay UE to act as the relay for the remote UE, wherein the relay UE is configured to establish a direct connection between the relay UE and the remote UE based on the relay initiation and configuration message received from the eNodeB.

15. The at least one non-transitory machine readable storage medium of claim 14, further comprising instructions which when executed by the at least one processor of the eNodeB performs the following: transmitting data to the remote UE via the relay UE, wherein the relay UE is configured to receive the data from the eNodeB and relay the data to the remote UE via the direct connection between the relay UE and the remote UE.

16. The at least one non-transitory machine readable storage medium of claim 14, wherein the relay UE is in coverage of the eNodeB and the remote UE is out-of-coverage with the eNodeB or in coverage of the eNodeB.

17. The at least one non-transitory machine readable storage medium of claim 14, wherein the eNodeB transmits the relay configuration parameters to the relay UE via a broadcast message and the eNodeB transmits the relay initiation and configuration message to the relay UE via dedicated signaling.

18. The at least one non-transitory machine readable storage medium of claim 14, further comprising instructions which when executed by the at least one processor of the eNodeB performs the following: transmitting the relay initiation and configuration message to the relay UE to authorize the relay UE to act as the relay after receiving a measurement report from the remote UE when the remote UE is in coverage of the eNodeB, wherein the measurement report indicates that a connection between the remote UE and the eNodeB is below a defined threshold.

19. The at least one non-transitory machine readable storage medium of claim 14, further comprising instructions which when executed by the at least one processor of the eNodeB performs the following:
  receiving a message from the relay UE indicating that the direct connection between the relay UE and the remote UE is successfully established, wherein the remote UE is in coverage of the eNodeB; and
  releasing a radio resource control (RRC) connection with the remote UE.

* * * * *